US012273976B2

(12) United States Patent
DeJonge

(10) Patent No.: US 12,273,976 B2
(45) Date of Patent: Apr. 8, 2025

(54) DRIVE CIRCUIT FOR A LIGHT-EMITTING DIODE LIGHT SOURCE

(71) Applicant: Lutron Technology Company LLC, Coopersburg, PA (US)

(72) Inventor: Stuart W. DeJonge, Riegelsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/532,112

(22) Filed: Dec. 7, 2023

(65) Prior Publication Data

US 2024/0130019 A1 Apr. 18, 2024

Related U.S. Application Data

(63) Continuation of application No. 17/833,479, filed on Jun. 6, 2022, now Pat. No. 11,877,361, which is a continuation-in-part of application No. 17/162,891, filed on Jan. 29, 2021, now Pat. No. 11,357,084.

(60) Provisional application No. 62/968,566, filed on Jan. 31, 2020.

(51) Int. Cl.
*H05B 45/10* (2020.01)
*H05B 45/14* (2020.01)
*H05B 45/385* (2020.01)
*H05B 45/46* (2020.01)

(52) U.S. Cl.
CPC .......... *H05B 45/385* (2020.01); *H05B 45/14* (2020.01); *H05B 45/46* (2020.01)

(58) Field of Classification Search
CPC ........ H05B 45/10; H05B 45/14; H05B 45/16; H05B 45/385; H05B 45/46; H05B 47/10; H05B 47/16
See application file for complete search history.

(56) References Cited

U.S. PATENT DOCUMENTS

| | | | |
|---|---|---|---|
| 7,489,090 | B2 | 2/2009 | Taipale |
| 7,759,881 | B1 | 7/2010 | Melanson |
| 8,339,064 | B2 | 12/2012 | Ku et al. |
| 8,466,628 | B2 | 6/2013 | Shearer et al. |
| 8,492,987 | B2 | 7/2013 | Nuhfer et al. |
| 8,680,787 | B2 | 3/2014 | Veskovic et al. |
| 9,232,574 | B2 | 1/2016 | Veskovic |
| 9,247,608 | B2 | 1/2016 | Chitta et al. |
| 9,253,829 | B2 | 2/2016 | Veskovic |

(Continued)

FOREIGN PATENT DOCUMENTS

CN 102412727 B * 2/2014 ......... H05B 33/0815

*Primary Examiner* — Jimmy T Vu

(74) *Attorney, Agent, or Firm* — Michael S. Czarnecki; Glen R. Farbanish; Philip N. Smith

(57) ABSTRACT

A controllable lighting device may comprise a drive circuit characterized by one or more cycles and a control circuit configured to control the drive circuit to conduct a load current through a light source of the lighting device. The control circuit may be configured to determine one or more operating parameters of the lighting device during a present cycle of the drive circuit based on a feedback signal indicative of a peak magnitude of the load current conducted through the light source. The control circuit may be able to adjust an average magnitude of the load current conducted through the light source so as to adjust an intensity of the light source towards a target intensity based on the operating parameters.

24 Claims, 8 Drawing Sheets

(56) References Cited

U.S. PATENT DOCUMENTS

| | | | | |
|---|---|---|---|---|
| 9,565,731 | B2 | 2/2017 | DeJonge | |
| 9,655,177 | B2 | 5/2017 | Veskovic | |
| 9,655,180 | B2 | 5/2017 | Stevens, Jr. et al. | |
| 10,098,196 | B2 | 10/2018 | Kober | |
| 10,251,231 | B1 | 4/2019 | DeJonge et al. | |
| 10,314,129 | B2 | 6/2019 | Kober et al. | |
| 2006/0092099 | A1 | 5/2006 | Matsuda | |
| 2008/0224636 | A1 | 9/2008 | Melanson | |
| 2010/0156309 | A1 * | 6/2010 | Liu ........................ | H05B 45/10 315/246 |
| 2011/0080110 | A1 | 4/2011 | Nuhfer et al. | |
| 2011/0204797 | A1 | 8/2011 | Lin et al. | |
| 2013/0020964 | A1 | 1/2013 | Nuhfer et al. | |
| 2014/0354170 | A1 | 12/2014 | Gredler et al. | |
| 2015/0340957 | A1 | 11/2015 | Fang et al. | |
| 2016/0119998 | A1 | 4/2016 | Linnartz et al. | |
| 2017/0188420 | A1 | 6/2017 | Kido et al. | |
| 2017/0250620 | A1 | 8/2017 | White et al. | |
| 2018/0249543 | A1 | 8/2018 | Kober et al. | |

* cited by examiner

DRIVE CIRCUIT FOR A LIGHT-EMITTING DIODE LIGHT SOURCE

CROSS-REFERENCE TO RELATED APPLICATION

This application is a continuation of U.S. application Ser. No. 17/833,479 filed Jun. 6, 2022; which is a continuation of U.S. application Ser. No. 17/162,891 filed Jan. 29, 2021, now U.S. Pat. No. 11,357,084 issued Jun. 7, 2022, which claims the benefit of Provisional U.S. Patent Application No. 62/968,566, filed Jan. 31, 2020, the disclosures of which are incorporated herein by reference in their entirety.

BACKGROUND

Light-emitting diode (LED) light sources (e.g., LED light engines) are replacing conventional incandescent, fluorescent, and halogen lamps as a primary form of lighting devices. LED light sources may comprise a plurality of light-emitting diodes mounted on a single structure and provided in a suitable housing. LED light sources may be more efficient and provide longer operational lives as compared to incandescent, fluorescent, and halogen lamps. An LED driver control device (e.g., an LED driver) may be coupled between a power source, such as an alternating-current (AC) power source or a direct-current (DC) power source, and an LED light source for regulating the power supplied to the LED light source. For example, the LED driver may regulate the voltage provided to the LED light source, the current supplied to the LED light source, or both the current and voltage.

Different control techniques may be employed to drive LED light sources including, for example, a current load control technique and a voltage load control technique. An LED light source driven by the current load control technique may be characterized by a rated current (e.g., approximately 350 milliamps) to which the magnitude (e.g., peak or average magnitude) of the current through the LED light source may be regulated to ensure that the LED light source is illuminated to the appropriate intensity and/or color. An LED light source driven by the voltage load control technique may be characterized by a rated voltage (e.g., approximately 15 volts) to which the voltage across the LED light source may be regulated to ensure proper operation of the LED light source. If an LED light source rated for the voltage load control technique includes multiple parallel strings of LEDs, a current balance regulation element may be used to ensure that the parallel strings have the same impedance so that the same current is drawn in each of the parallel strings.

The light output of an LED light source may be dimmed. Methods for dimming an LED light source may include, for example, a pulse-width modulation (PWM) technique and a constant current reduction (CCR) technique. In pulse-width modulation dimming, a pulsed signal with a varying duty cycle may be supplied to the LED light source. For example, if the LED light source is being controlled using a current load control technique, the peak current supplied to the LED light source may be kept constant during an on-time of the duty cycle of the pulsed signal. The duty cycle of the pulsed signal may be varied, however, to vary the average current supplied to the LED light source, thereby changing the intensity of the light output of the LED light source. As another example, if the LED light source is being controlled using a voltage load control technique, the voltage supplied to the LED light source may be kept constant during the on-time of the duty cycle of the pulsed signal. The duty cycle of the load voltage may be varied, however, to adjust the intensity of the light output. Constant current reduction dimming may be used if an LED light source is being controlled using the current load control technique. In constant current reduction dimming, current may be continuously provided to the LED light source. The DC magnitude of the current provided to the LED light source, however, may be varied to adjust the intensity of the light output.

Examples of LED drivers are described in U.S. Pat. No. 8,492,987, issued Jul. 23, 2013, entitled LOAD CONTROL DEVICE FOR A LIGHT-EMITTING DIODE LIGHT SOURCE; U.S. Pat. No. 9,655,177, issued May 16, 2017, entitled FORWARD CONVERTER HAVING A PRIMARY-SIDE CURRENT SENSE CIRCUIT; and U.S. Pat. No. 9,247,608, issued Jan. 26, 2016, entitled LOAD CONTROL DEVICE FOR A LIGHT-EMITTING DIODE LIGHT SOURCE; the entire disclosures of which are hereby incorporated by reference.

SUMMARY

As described herein is a controllable lighting device comprising a light-emitting diode (LED) light source, an LED drive circuit, a feedback circuit and a control circuit. The LED drive circuit may include a controllably conductive device configured to conduct a load current through the LED light source and the feedback circuit may be configured to generate a feedback signal indicative of a peak magnitude of the load current conducted through the LED light source. The control circuit may operate to render the controllably conductive device of the LED drive circuit conductive and non-conductive to adjust an average magnitude of the load current conducted through the LED light source so as to adjust an intensity of the LED light source towards a target intensity. For example, the control circuit may render the controllably conductive device conductive for an on-time during a present cycle of the LED drive circuit to cause the controllably conductive device to conduct the load current at the peak magnitude during the on-time. The control circuit may receive the feedback signal during the on-time of the present cycle of the LED drive circuit and determine an operating period for the present cycle based on a magnitude of the feedback signal and the target intensity.

The controllable lighting device may further include a power converter circuit configured to generate a bus voltage that is received by the LED drive circuit. The peak magnitude of the load current during the on-time of the present cycle of the LED drive circuit may be dependent upon the magnitude of the bus voltage, and the control circuit may be coupled to the power converter circuit and configured to generate a bus control signal for adjusting the magnitude of the bus voltage to maintain the respective operating periods of one or more cycles of the LED drive circuit to be between a maximum value and a minimum value. For example, the control circuit may control the bus control signal to decrease the bus voltage in response to determining the that the operating period of the present cycle of the LED drive circuit is above the maximum value and to increase the bus voltage in response to determining that the operating period of the present cycle of the LED drive circuit is below the minimum value. The maximum value of the operating period may be set to a first value when the target intensity is between a maximum intensity and a transition intensity, and may be increased from the first value when the target intensity is below the transition intensity. The minimum value of the operating period may be set to a value independent of the target intensity of the LED light source.

DETAILED DESCRIPTION

Figure 1:
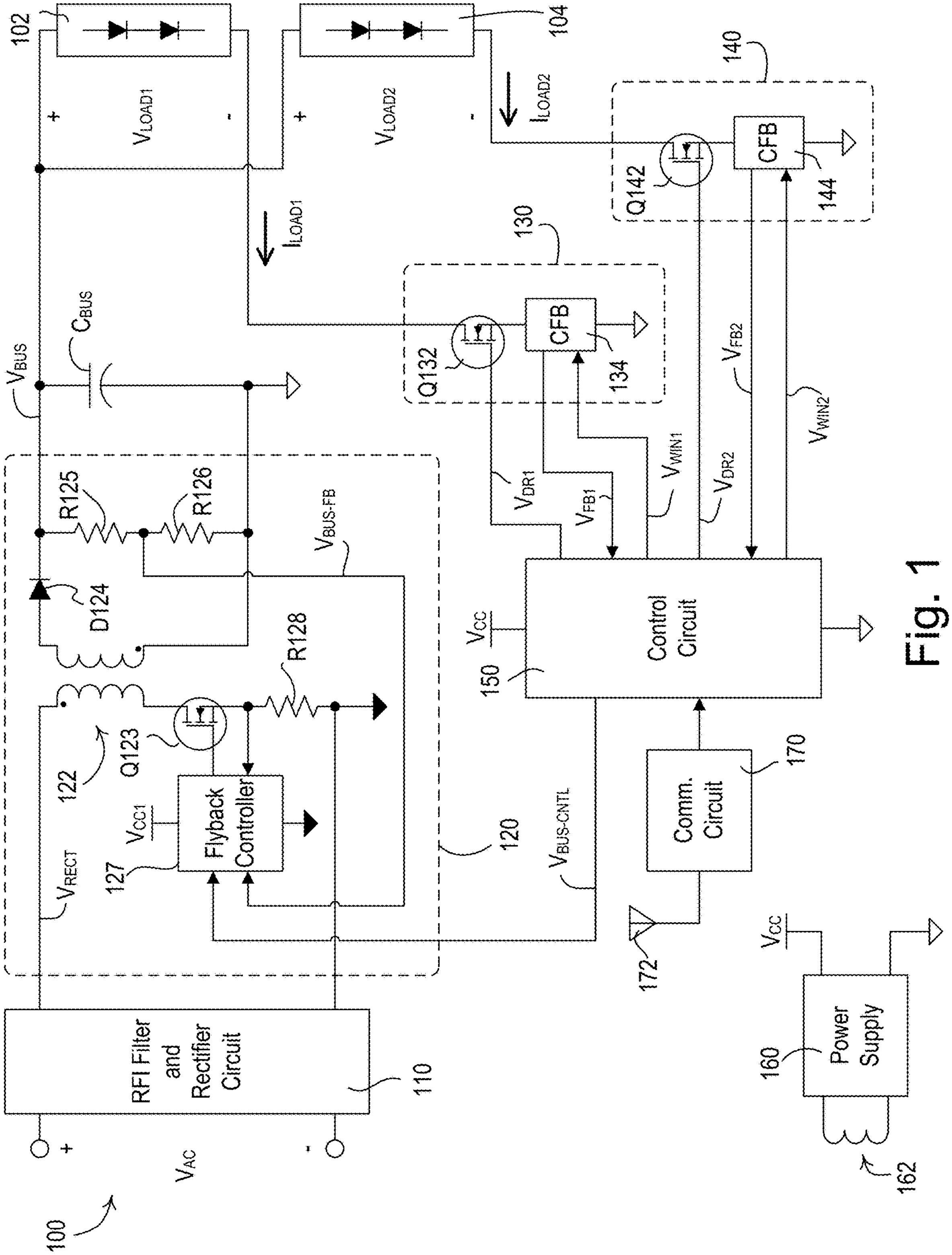
FIG. 1 is a simplified block diagram of a controllable electrical device, such as a controllable light source.

FIG. 1 is a simplified block diagram of a controllable electrical device, such as a controllable lighting device 100 (e.g., a controllable light source). For example, the controllable lighting device 100 may be a lamp that comprise one or more light sources, such as light-emitting diode (LED) light sources 102, 104 (e.g., LED light engines). The LED light sources 102, 104 may be controlled to adjust an intensity and/or a color (e.g., a color temperature) of a cumulative light output of the controllable lighting device 100. Each LED light source 102, 104 is shown in FIG. 1 as a plurality of LEDs connected in series but may comprise a single LED or a plurality of LEDs connected in parallel or a suitable combination thereof, depending on the particular lighting system. In addition, each LED light source 102, 104 may comprise one or more organic light-emitting diodes (OLEDs). The controllable lighting device 100 may include a plurality of different LED light sources, which may be rated at different magnitudes of load current and voltage. While not shown in FIG. 1, the controllable lighting device 100 may comprise a housing (e.g., a translucent housing) in which the LED light sources are located and through which the LED light sources may shine. For example, the controllable lighting device 100 may be capable of providing warm-dimming such that the color temperature of the cumulative light output shifts towards a warm-white color temperature as the intensity of the cumulative light output is decreased. For example, the first LED light source 102 may comprise a white LED light source and the second LED light source 104 may comprise a warm-white (e.g., red) LED light source, and the first LED light source 102 may have a higher power rating than the second LED light source 104.

The controllable lighting device 100 may be a screw-in LED lamp configured to be screwed into a standard Edison socket. The controllable light device 100 may comprise a screw-in base that includes a hot connection H and a neutral connection N for receiving an alternating-current (AC) voltage $V_{AC}$ from an AC power source (not shown). The hot connection H and the neutral connection N may also be configured to receive a direct-current (DC) voltage from a DC power source. The controllable lighting device 100 may comprise a radio-frequency interference (RFI) filter and rectifier circuit 110, which may receive the AC voltage $V_{AC}$. The RFI filter and rectifier circuit 110 may operate to minimize the noise provided on the AC power source and to generate a rectified voltage $V_{RECT}$.

The controllable lighting device 100 may comprise a power converter circuit 120, such as a flyback converter, which may receive the rectified voltage $V_{RECT}$ and generate a variable direct-current (DC) bus voltage $V_{BUS}$ across a bus capacitor $C_{BUS}$. The power converter circuit 120 may comprise other types of power converter circuits, such as, for example, a boost converter, a buck converter, a buck-boost converter, a single-ended primary-inductance converter (SEPIC), a Ćuk converter, or any other suitable power converter circuit for generating an appropriate bus voltage. The power converter circuit 120 may provide electrical isolation between the AC power source and the LED light source 102, 104 and may operate as a power factor correction (PFC) circuit to adjust the power factor of the controllable lighting device 100 towards a power factor of one.

As shown in FIG. 1, the flyback converter 120 may comprise a flyback transformer 122, a field-effect transistor (FET) Q123, a diode D124, a resistor R125, a resistor R126, a flyback control circuit 127, and/or a feedback resistor R128. The flyback transformer 122 may comprise a primary winding and a secondary winding. The primary winding may be coupled in series with the FET Q123. Although illustrated as the FET Q123, any switching transistor or other suitable semiconductor switch may be coupled in series with the primary winding of the flyback transformer 122. The secondary winding of the flyback transformer 122 may be coupled to the bus capacitor $C_{BUS}$ via the diode D124. A bus voltage feedback signal $V_{BUS\text{-}FB}$ may be generated, e.g., by a voltage divider comprising the resistors R125, R126 coupled across the bus capacitor $C_{BUS}$. The flyback control circuit 127 may receive the bus voltage feedback signal $V_{BUS\text{-}FB}$ and/or a control signal representative of the current through the FET Q123 from the feedback resistor R128, which may be coupled in series with the FET Q123. The flyback control circuit 127 may control the FET Q123 to selectively conduct current through the flyback transformer 122 to generate the bus voltage $V_{BUS}$. The flyback control circuit 127 may render the FET Q123 conductive and non-conductive, for example, to control the magnitude of the bus voltage $V_{BUS}$ towards a target bus voltage $V_{BUS\text{-}TRGT}$ in response to the DC magnitude of the bus voltage feedback signal $V_{BUS\text{-}FB}$ and/or the magnitude of the current through the FET Q123.

The controllable lighting device 100 may comprise one or more load regulation circuits, such as LED drive circuits 130, 140, for controlling power delivered to (e.g., the intensities of) the LED light sources 102, 104, respectively. The LED drive circuits 130, 140 may each receive the bus voltage $V_{BUS}$ and may adjust magnitudes of respective load currents $I_{LOAD1}$, $I_{LOAD2}$ conducted through the LED light sources 102, 104 and/or magnitudes of respective load voltages $V_{LOAD1}$, $V_{LOAD2}$ generated across the LED light sources. Examples of various embodiments of LED drive circuits are described in U.S. Pat. No. 8,492,987, filed Jul. 23, 2013, and U.S. Pat. No. 9,253,829, issued Feb. 2, 2016, both entitled LOAD CONTROL DEVICE FOR A LIGHT-EMITTING DIODE LIGHT SOURCE, the entire disclosures of which are hereby incorporated by reference.

The controllable lighting device 100 may comprise a control circuit 150 for controlling the LED drive circuits 130, 140 to control the magnitudes of the respective load currents $I_{LOAD1}$, $I_{LOAD2}$ conducted through the LED light sources 102, 104 to adjust the respective intensities of the LED light sources. For example, the control circuit 150 may comprise a digital control circuit, such as, a microprocessor, a microcontroller, a programmable logic device (PLD), an application specific integrated circuit (ASIC), a field-programmable gate array (FPGA), or any other suitable processing device or controller. The control circuit 150 may be configured to turn one or both of the LED light sources 102, 104 on to turn the controllable lighting device 100 on, and turn both of the LED light sources 102, 104 off to turn the controllable lighting device 100 off. The control circuit 150 may be configured to control the respective intensities of the LED light sources 102, 104 to control the intensity and/or the color (e.g., the color temperature) of the cumulative light emitted by the controllable lighting device 100. The control circuit 150 may be configured to adjust (e.g., dim) a present intensity $L_{PRES}$ of the cumulative light emitted by the controllable lighting device 100 towards a target intensity $L_{TRGT}$, which may range across a dimming range of the controllable light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The control circuit 150 may be configured to adjust a present color temperature $T_{PRES}$ of the cumulative light emitted by the controllable lighting device 100 towards a target color temperature $T_{TRGT}$, which may range between a cool-white color temperature (e.g., approximately 3100-4500 K) and a warm-white color temperature (e.g., approximately 2000-3000 K). For example, the control circuit may be configured to determine a respective target intensity $L_{TRGT1}$, $L_{TRGT2}$ for each of the LED light sources 102, 104 in response to the target intensity $L_{TRGT}$ and/or the target color temperature $T_{TRGT}$ for the controllable lighting device 100.

The control circuit 150 may comprise a memory (not shown) configured to store operational characteristics of the controllable lighting device 100 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the control circuit 150. The controllable lighting device 100 may comprise a power supply 160 that may be coupled to a winding 162 of the flyback transformer 122 of the power converter circuit 120 and may be configured to generate a supply voltage $V_{CC}$ for powering the control circuit 150 and other low-voltage circuitry of the controllable lighting device.

The controllable lighting device 100 may comprise a communication circuit 170 coupled to the control circuit 150. The communication circuit 170 may comprise a wireless communication circuit, such as, for example, a radio-frequency (RF) transceiver coupled to an antenna 172 for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. The communication circuit 170 may be coupled to the hot connection H and the neutral connection N of the controllable lighting device 100 for transmitting a control signal via the electrical wiring using, for example, a power-line carrier (PLC) communication technique. The control circuit 150 may be configured to determine the target intensity $L_{TRGT}$ and/or the target color temperature $T_{TRGT}$ for the controllable lighting device 100 in response to messages (e.g., digital messages) received via the communication circuit 170.

The LED drive circuits 130, 140 may comprise respective controllably conductive devices (e.g., switching devices such as field-effect transistors (FET) Q132, Q142) coupled (e.g., in series) with the LED light sources 102, 104, respectively, for conducting the load currents $I_{LOAD1}$, $I_{LOAD2}$. Each FET Q132, Q142 may comprise any type of suitable power semiconductor switch, such as, for example, a bipolar junction transistor (BJT), and/or an insulated-gate bipolar transistor (IGBT). The control circuit 150 may be configured to generate one or more drive signals such as drive signals $V_{DR1}$, $V_{DR2}$ that may be received by gates of the respective FETs Q132, Q142 for rendering the FETs conductive and non-conductive. The control circuit 150 may be configured to pulse-width modulate (PWM) the drive signals $V_{DR1}$, $V_{DR2}$ to adjust average magnitudes of the load currents $I_{LOAD1}$, $I_{LOAD2}$, respectively. For example, the control circuit 150 may be configured to adjust respective duty cycles of the drive signals $V_{DR1}$, $V_{DR2}$ to adjust the average magnitudes of the load currents $I_{LOAD1}$, $I_{LOAD2}$, respectively. The control circuit 150 may be configured to determine an on-time $T_{ON}$ for a present cycle of each of the drive signals $V_{DR1}$, $V_{DR2}$ based on the target intensities $L_{TRGT1}$, $L_{TRGT2}$ of the LED light sources 102, 104, respectively (e.g., as will be described in greater detail below).

The FETs Q132, Q142 may be coupled (e.g., in series) with respective feedback circuits, e.g., current feedback (CFB) circuits 134, 144. The current feedback circuits 134, 144 may generate respective current feedback signals $V_{FB1}$, $V_{FB2}$, which may be received by the control circuit 150. The control circuit 150 may generate feedback window control signals $V_{WIN1}$, $V_{WIN2}$ that may be received by the respective current feedback circuits 134, 144 for controlling the operation of the current feedback circuits, such that the magnitudes of the current feedback signals $V_{FB1}$, $V_{FB2}$ may indicate peak magnitudes $I_{PK1}$, $I_{PK2}$ of the respective load currents $I_{LOAD1}$, $I_{LOAD2}$. The control circuit 150 may be configured to sample the current feedback signals $V_{FB1}$, $V_{FB2}$ during a present cycle of each of the drive signals $V_{DR1}$, $V_{DR2}$ and determine a respective operating period $T_{OP}$ for the present cycle of each of the drive signals $V_{DR1}$, $V_{DR2}$ in response to the respective peak magnitudes $I_{PK1}$, $I_{PK2}$ of the load currents $I_{LOAD1}$, $I_{LOAD2}$ (e.g., as will be described in greater detail below).

The peak magnitudes $I_{PK1}$, $I_{PK2}$ of the respective load currents $I_{LOAD1}$, $I_{LOAD2}$ may be dependent upon the magnitude of the bus voltage $V_{BUS}$. The control circuit 150 may be configured to control the operation of the power converter circuit 120 in response to the peak magnitudes $I_{PK1}$, $I_{PK2}$ of the respective load currents $I_{LOAD1}$, $I_{LOAD2}$. The control circuit 150 may generate a bus control signal $V_{BUS\text{-}CNTL}$ that may be received by the flyback control circuit 127 for adjusting the target bus voltage $V_{BUS\text{-}TRGT}$ of the power converter circuit 120. The control circuit 150 may be configured to limit the respective operating periods $T_{OP}$ of the drive signals $V_{DR1}$, $V_{DR2}$ to be between a minimum operating period $T_{OP\text{-}MIN}$ and a maximum operating period $T_{OP\text{-}MAX}$. For example, the control circuit 150 may be configured to increase the magnitude of the bus voltage $V_{BUS}$ when the operating period $T_{OP}$ of at least one of the drive signals $V_{DR1}$, $V_{DR2}$ is less than the minimum operating period $T_{OP\text{-}MIN}$. The control circuit 150 may be configured to decrease the magnitude of the bus voltage $V_{BUS}$ when the operating period $T_{OP}$ of at least one of the drive signals $V_{DR1}$, $V_{DR2}$ is greater than the maximum operating period $T_{OP\text{-}MAX}$.

Figure 2A:
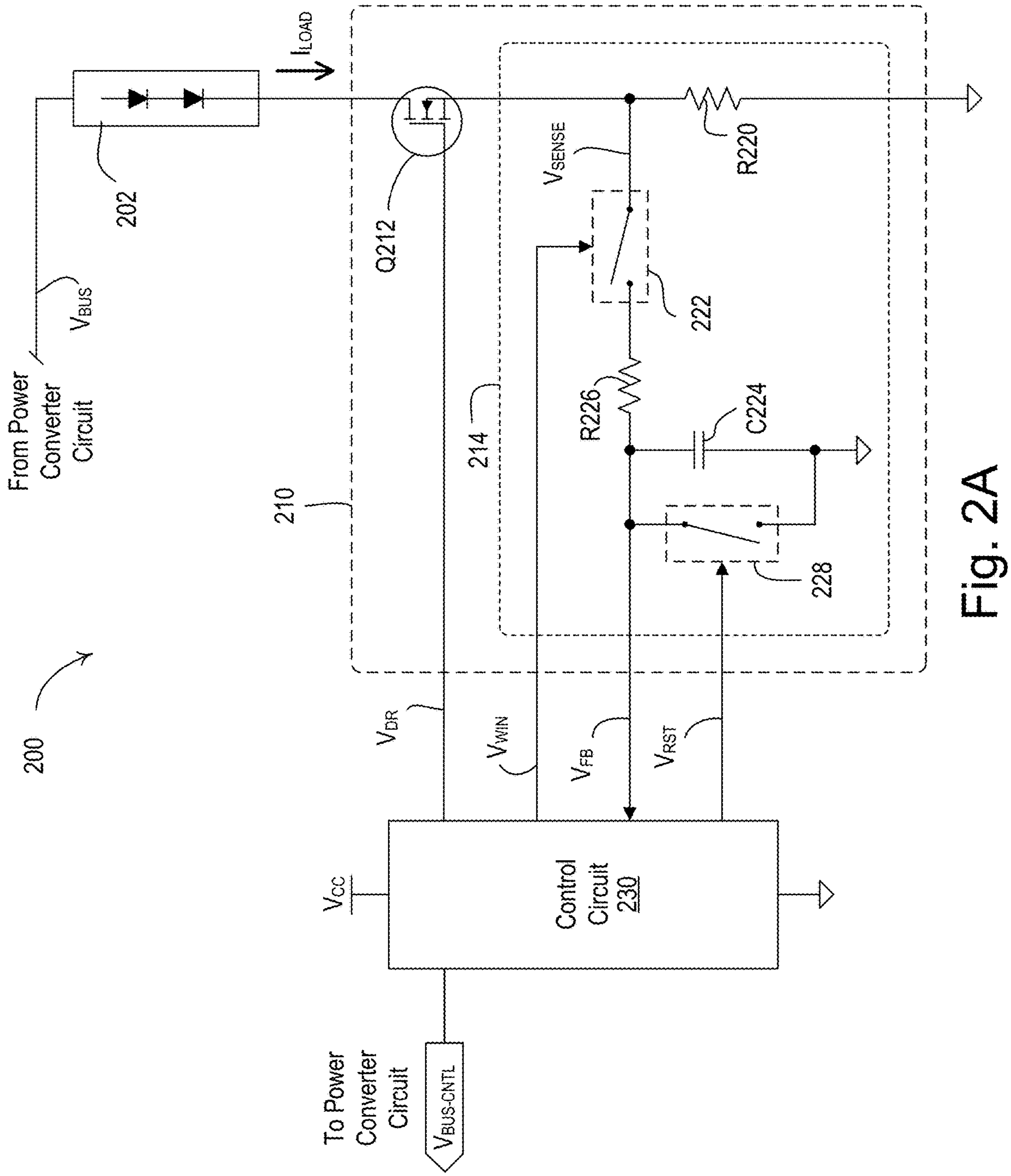
FIGS. 2A and 2B are simplified schematic diagrams of example drive circuits, such as light-emitting diode (LED) drive circuits, of a controllable light source.

FIG. 2A is a simplified schematic diagram of an example of an LED drive circuit 210 (e.g., one of the LED drive circuits 130, 140) of an electrical device 200, such as a load control device, an LED driver or a controllable light source (e.g., the controllable lighting device 100). The LED drive circuit 210 may be coupled in series with an LED light source 202 (e.g., one of the LED light sources 102, 104) for conducting a load current $I_{LOAD}$ through the LED light source. The LED light source 202 may be configured to receive a bus voltage $V_{BUS}$ from a power converter circuit (e.g., the power converter circuit 120).

The electrical device 200 may comprise a control circuit 230 (e.g., the control circuit 150). The control circuit 230 may also generate a drive signal $V_{DR}$ for controlling the LED drive circuit 210 to adjust a magnitude (e.g., an average magnitude) of the load current $I_{LOAD}$ through the LED light source. The control circuit 230 may be configured to adjust the intensity of the LED light source 202 towards a target intensity $L_{TRGT}$ that may range between a minimum intensity $L_{MIN}$ (e.g., approximately 0.1%-1.0%) and a maximum intensity $L_{MAX}$ (e.g., approximately 100%). The minimum intensity $L_{MIN}$ may be approximately the lowest intensity at which the control circuit 230 may control the LED light source 202 under steady state conditions (e.g., when the target intensity $L_{TRGT}$ is being held constant). The control circuit 230 may be configured to determine a target current $I_{TRGT}$ (e.g., a target average current to which to regulate the average magnitude of the load current $I_{LOAD}$) from the target intensity $L_{TRGT}$. The control circuit 230 may be configured to fade (e.g., gradually adjust over a period of time) the target intensity $L_{TRGT}$ (and thus the present intensity) of the LED light source 202. The control circuit 230 may be configured to fade the LED light source 202 from off to on by turning on the LED light source to a minimum fading intensity $L_{FADE\text{-}MIN}$ and then slowly increasing the present intensity $L_{PRES}$ of the LED light source from the minimum fading intensity $L_{FADE\text{-}MIN}$ to the target intensity $L_{TRGT}$. For example, the minimum fading intensity $L_{FADE\text{-}MIN}$ may be less than the minimum intensity $L_{MIN}$ (e.g., such as approximately 0.02%).

The LED drive circuit 210 may comprise a controllably conductive device (e.g., a switching device, such as a FET Q212) coupled in series with the LED light source 202. The FET Q212 may comprise any type of suitable power semiconductor switch, such as, for example, a bipolar junction transistor (BJT), and/or an insulated-gate bipolar transistor (IGBT). The drive signal $V_{DR}$ generated by the control circuit 230 may be received by a gate of the FET Q212. The FET Q212 may be rendered conductive and non-conductive for adjusting the average magnitude of the load current $I_{LOAD}$. The control circuit 230 may be configured to control the FET Q212 as a switching device by driving the FET Q212 into the saturation region when the FET Q212 is conductive. The FET Q212 may be characterized by a drain-source on resistance $R_{DS\text{-}ON}$ when the FET Q212 is controlled into the saturation region. The control circuit 230 may be configured to control the LED drive circuit 210 on a periodic (e.g., a cyclic) basis. For example, the control circuit 230 may be configured to pulse-width modulate (PWM) the drive signal $V_{DR}$ to pulse-width modulate the load current $I_{LOAD}$. Each cycle of control of the LED driver circuit 210 may be associated with (e.g., characterized by) an operating period $T_{OP}$ (e.g., a length of the cycle).

The LED drive circuit 210 may comprise a current feedback circuit 214 coupled in series with the FET Q212 for generating a current feedback signal $V_{FB}$ that may have a DC magnitude representative of a magnitude (e.g., a peak magnitude $I_{PK}$) of the load current $I_{LOAD}$. As shown in FIG. 2A, the current feedback circuit 214 may be coupled to the source of the FET Q212. The current feedback circuit 214 may comprise a sense resistor R220 that may have a resistance $R_{SENSE}$. The sense resistor R220 may be coupled in series between the FET Q212 and circuit common for generating a sense voltage $V_{SENSE}$ across the sense resistor R220. The current feedback circuit 214 may comprise a first controllable switch 222 that receives the sense voltage $V_{SENSE}$. The first controllable switch 222 may be rendered conductive and non-conductive in response to a feedback window control signal $V_{WIN}$ (e.g., a switch control signal) generated by the control circuit 230. The first controllable switch 222 may be coupled to a filter circuit, which may comprise a capacitor C224 and a resistor R226. The feedback signal $V_{FB}$ may be generated across the capacitor C224. The current feedback circuit 214 may also comprise a second controllable switch 228 coupled in parallel with the capacitor C224. The second controllable switch 228 may be rendered conductive and non-conductive in response to a reset control signal $V_{RST}$ generated by the control circuit 230.

The control circuit 230 may be configured to control the first controllable switch 222 of the current feedback circuit 214 to be conductive during the on-time $T_{ON}$ of the drive signal $V_{DR}$ (e.g., when the FET Q212 is conductive). After the first controllable switch 222 is rendered conductive at the beginning of the on-time $T_{ON}$, the capacitor C224 may charge to approximately the peak magnitude $V_{PK}$ of the sense voltage $V_{SENSE}$ through the resistor R226, such that the magnitude of the current feedback signal $V_{FB}$ may indicate the peak magnitude $I_{PK}$ of the load current $I_{LOAD}$. The control circuit 230 may receive the current feedback signal $V_{FB}$ generated by the current feedback circuit 214, and may sample the current feedback signal $V_{FB}$ during the on-time $T_{ON}$ (e.g., for the entirety of the on-time $T_{ON}$ or during a portion of the on-time $T_{ON}$) of the drive signal $V_{DR}$ to determine the peak magnitude $I_{PK}$ of the load current $I_{LOAD}$. For example, the control circuit 230 may calculate the peak magnitude $I_{PK}$ of the load current $I_{LOAD}$ using the sampled magnitude of the current feedback signal $V_{FB}$ and the resistance $R_{SENSE}$ of the sense resistor R220, e.g., $I_{PK}=V_{FB}/R_{SENSE}$. For example, the control circuit 230 may store the resistance $R_{SENSE}$ of the sense resistor R220 in memory and may retrieve the resistance $R_{SENSE}$ from memory in order to calculate the peak magnitude $I_{PK}$ of the load current $I_{LOAD}$. The control circuit 230 may render the first controllable switch 222 non-conductive at or before the end of the on-time $T_{ON}$. After the end of the on-time $T_{ON}$, the control circuit 230 may render the second controllable switch 228 conductive for a reset period $T_{RST}$ (e.g., a reset pulse) in order to discharge the capacitor C224 so that the current feedback circuit 214 may control the magnitude of the current feedback signal $V_{FB}$ to indicate the peak magnitude $I_{PK}$ of the load current $I_{LOAD}$ during a subsequent cycle (e.g., the next cycle) of the LED drive circuit 210.

During each cycle of control of the LED drive circuit 210, the control circuit 230 may be configured to render the FET Q212 conductive for a first portion (e.g., an on-time $T_{ON}$) of the cycle and non-conductive for a second portion (e.g., an off-time $T_{OFF}$) of the cycle. For example, the control circuit 230 may be configured to adjust the average magnitude of the load current $I_{LOAD}$ by adjusting a duty cycle DC of the drive signal $V_{DR}$, e.g., $DC=T_{ON}/T_{OP}=T_{ON}/(T_{ON}+T_{OFF})$. The control circuit 230 may be configured to determine the on-time $T_{ON}$ for the drive signal $V_{DR}$ (e.g., for a present cycle of the LED drive circuit 210) based on the target intensity $L_{TRGT}$ of the LED light source 202 (e.g., using open loop control). Since the FET Q212 is controlled as a switching device and is rendered conductive (e.g., controlled into the saturation region) during the on-time $T_{ON}$ of the drive signal $V_{DR}$, the load current $I_{LOAD}$ may be characterized by an on-time that is the same length as the on-time $T_{ON}$ of the drive signal $V_{DR}$. The FET Q212 may conduct the load current $I_{LOAD}$ at the peak magnitude $I_{PK}$ during the on-time. The control circuit 230 may be configured to determine a length of the operating period $T_{OP}$ of the drive signal $V_{DR}$ for the present cycle of the LED drive circuit 210 in response to the peak magnitude $I_{PK}$ of the load current $I_{LOAD}$ as determined from the current feedback signal $V_{FB}$ (e.g., using closed loop control). The control circuit 230 may not control the peak magnitude $I_{PK}$ of the load current $I_{LOAD}$ during the on-time using closed loop control (e.g., to regulate the peak magnitude $I_{PK}$ towards a target peak current by comparing the peak current $I_{PK}$ to a threshold).

The control circuit 230 may also be configured to generate a bus control signal $V_{BUS-CNTL}$ that may be received by the power converter circuit for adjusting the magnitude of the bus voltage $V_{BUS}$. The control circuit 230 may be configured to maintain the bus control signal $V_{BUS-CNTL}$ constant (e.g., substantially constant) during each cycle of the LED drive circuit 210. The control circuit 230 may be configured to control the bus control signal $V_{BUS-CNTL}$ to adjust the magnitude from one cycle to the next (e.g., as will be described in greater detail below with reference to FIGS. 6B and 6C). Since the FET Q212 is driven into the saturation region during the on-time $T_{ON}$, the peak magnitude $I_{PK}$ of the load current $I_{LOAD}$ during the on-time $T_{ON}$ may be dependent upon the magnitude of the bus voltage $V_{BUS}$, the drain-source on resistance $R_{DS-ON}$, the resistance $R_{SENSE}$ of the sense resistor R220, and the characteristics of the LED light source 202 (e.g., the equivalent resistance of the LED light source). Since the control circuit 230 is not able to adjust the drain-source on resistance $R_{DS-ON}$, the resistance $R_{SENSE}$ of the sense resistor R220, and the characteristics of the LED light source 202, and the magnitude of the bus voltage $V_{BUS}$ remains constant during each cycle of the LED driver circuit 210, the control circuit 230 may not be able to control the peak magnitude $I_{PK}$ of the load current $I_{LOAD}$ during the present cycle. The peak magnitude $I_{PK}$ of the load current $I_{LOAD}$ may be different for different LED light sources that may be controlled by the LED drive circuit 210 (e.g., the peak magnitude $I_{PK}$ may not be deterministic). Accordingly, the peak magnitude $I_{PK}$ of the load current $I_{LOAD}$ may be considered an uncontrolled or unregulated magnitude (e.g., an uncontrolled or unregulated current). Since the control circuit 230 does not control the peak magnitude $I_{PK}$ of the load current $I_{LOAD}$ during the on-time using closed loop control (e.g., to regulate the peak magnitude $I_{PK}$ towards a target peak current), the peak magnitude $I_{PK}$ of the load current $I_{LOAD}$ may not be dependent upon the operation of the control circuit 230 during the present cycle (e.g., during the on-time). If the control circuit 230 used closed loop control to control the peak magnitude $I_{PK}$ during the on-time, the peak magnitude $I_{PK}$ would be the same (e.g., controlled to the target peak current) independent of the particular LED light source controlled by the LED drive circuit 210.

The control circuit 230 may be configured to control the average magnitude of the load current $I_{LOAD}$ by adjusting the operating period $T_{OP}$ for the present cycle of the drive signal $V_{DR}$. The control circuit may be configured to determine the operating period $T_{OP}$ for the present cycle of the drive signal $V_{DR}$ in response to the peak magnitude $I_{PK}$ of the load current $I_{LOAD}$ (e.g., an uncontrolled current) as determined from the current feedback signal $V_{FB}$. For example, the control circuit 230 may be configured to calculate the operating period $T_{OP}$ required to achieve the target current $I_{TRGT}$ (e.g., the average magnitude of the load current $I_{LOAD}$) at the present on-time $T_{ON}$ and the present peak magnitude $I_{PK}$ of the load current $I_{LOAD}$ (e.g., as determined from the current feedback signal $V_{FB}$), e.g., $T_{OP}=(I_{PK}\cdot T_{ON})/I_{TRGT}$. The off-time $T_{OFF}$ of the drive signal may be dependent upon the determined operating period $T_{OP}$, e.g., $T_{OFF}=T_{OP}-T_{ON}$. The control circuit may render the FET conductive at the end of the operating period $T_{OP}$ (e.g., the end of the present off-time $T_{OFF}$) to start the next cycle.

Figure 2B:
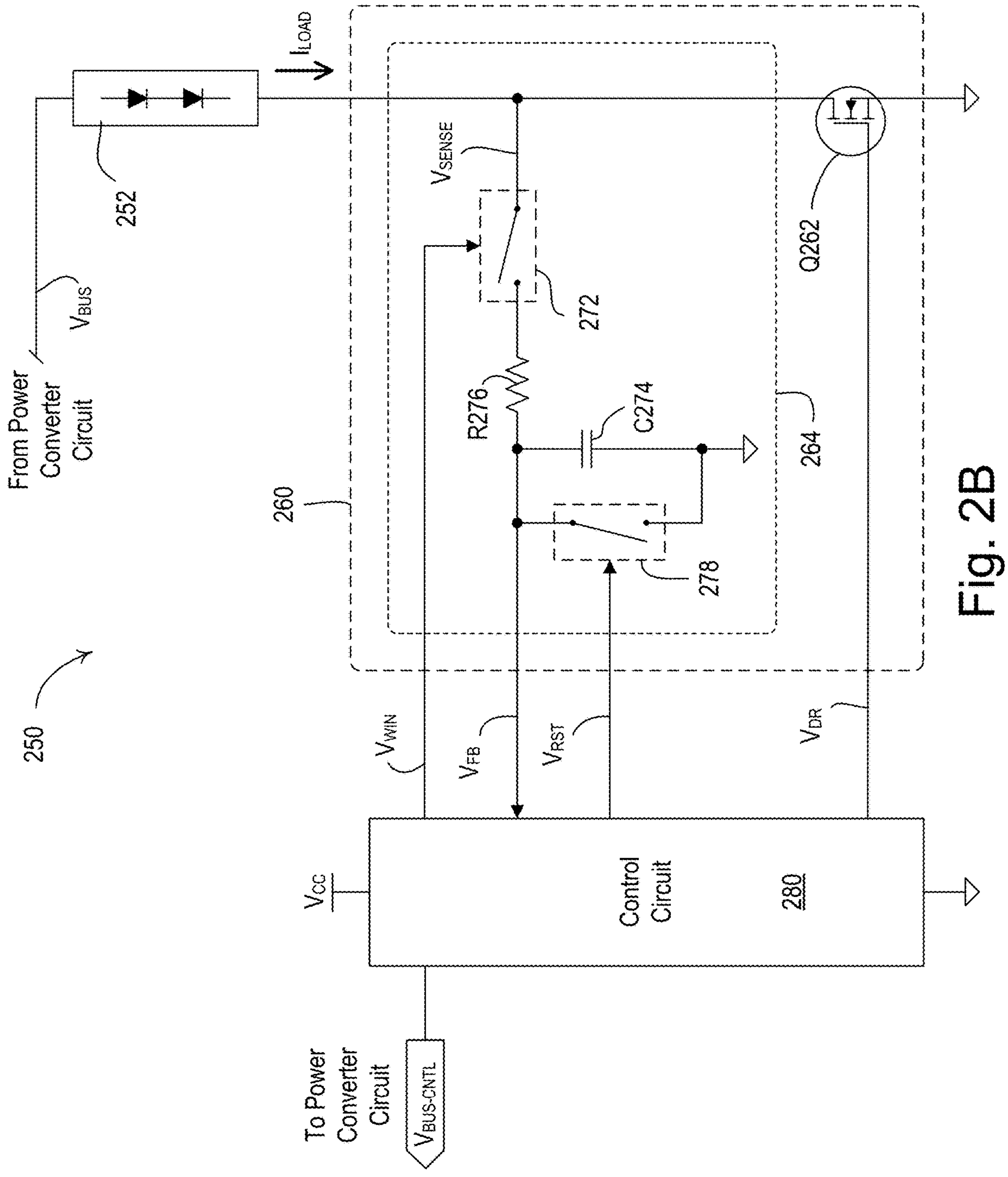

FIG. 2B is a simplified schematic diagram of another example of an LED drive circuit 260 (e.g., one of the LED drive circuits 130, 140) of an electrical device 250, such as a load control device, an LED driver or a controllable light source (e.g., the controllable lighting device 100). The LED drive circuit 260 may be coupled in series with an LED light source 252 (e.g., one of the LED light sources 102, 104) for conducting a load current $I_{LOAD}$ through the LED light source. The LED light source 252 may be configured to receive a bus voltage $V_{BUS}$ from a power converter circuit (e.g., the power converter circuit 120).

The electrical device 250 may comprise a control circuit 280 (e.g., the control circuit 150). The control circuit 280 may also generate a drive signal $V_{DR}$ for controlling the LED drive circuit 260 to adjust a magnitude (e.g., an average magnitude) of the load current $I_{LOAD}$ through the LED light source. The control circuit 280 may be configured to adjust the intensity of the LED light source 252 towards a target intensity $L_{TRGT}$ that may range between a minimum intensity $L_{MIN}$ (e.g., approximately 0.1%-1.0%) and a maximum intensity $L_{MAX}$ (e.g., approximately 100%). The minimum intensity $L_{MIN}$ may be approximately the lowest intensity at which the control circuit 280 may control the LED light source 252 under steady state conditions (e.g., when the target intensity $L_{TRGT}$ is being held constant). The control circuit 280 may be configured to determine a target current $I_{TRGT}$ (e.g., a target average current to which to regulate the average magnitude of the load current $I_{LOAD}$) from the target intensity $L_{TRGT}$. The control circuit 280 may be configured to fade (e.g., gradually adjust over a period of time) the target intensity $L_{TRGT}$ (and thus the present intensity) of the LED light source 252. The control circuit 280 may be configured to fade the LED light source 252 from off to on by turning on the LED light source to a minimum fading intensity $L_{FADE-MIN}$ and then slowly increasing the present intensity $L_{PRES}$ of the LED light source from the minimum fading intensity $L_{FADE-MIN}$ to the target intensity $L_{TRGT}$. For example, the minimum fading intensity $L_{FADE-MIN}$ may be less than the minimum intensity $L_{MIN}$ (e.g., such as approximately 0.02%).

The LED drive circuit 260 may comprise a controllably conductive device (e.g., a switching device, such as a FET Q262) coupled in series with the LED light source 252. As shown in FIG. 2B, the drain of the FET Q262 may be coupled to the bus voltage $V_{BUS}$, and the source of the FET Q262 may be coupled to circuit common. The FET Q262 may comprise any type of suitable power semiconductor switch, such as, for example, a bipolar junction transistor (BJT), and/or an insulated-gate bipolar transistor (IGBT). The drive signal $V_{DR}$ generated by the control circuit 280 may be received by a gate of the FET Q262. The FET Q262 may be rendered conductive and non-conductive for adjusting the average magnitude of the load current $I_{LOAD}$. The control circuit 280 may be configured to control the FET Q262 as a switching device by driving the FET Q262 into the saturation region when the FET Q262 is conductive. The FET Q262 may be characterized by a drain-source on resistance $R_{DS-ON}$ when the FET Q262 is controlled into the saturation region. The control circuit 280 may be configured to control the LED drive circuit 260 on a periodic (e.g., a cyclic) basis. For example, the control circuit 280 may be configured to pulse-width modulate (PWM) the drive signal $V_{DR}$ to pulse-width modulate the load current $I_{LOAD}$. Each cycle of control of the LED driver circuit 260 may be associated with (e.g., characterized by) an operating period $T_{OP}$ (e.g., a length of the cycle).

The LED drive circuit 260 may comprise a current feedback circuit 264 that may be configured to generate a current feedback signal $V_{FB}$ that may have a DC magnitude representative of a magnitude (e.g., a peak magnitude $I_{PK}$) of the load current $I_{LOAD}$. The current feedback circuit 264 may be coupled to the drain of the FET Q262 and may be responsive to a sense voltage $V_{SENSE}$ developed across the FET Q262 (e.g., the current feedback circuit 264 may not comprise a sense resistor, such as the sense resistor R220 shown in FIG. 2A). The magnitude of the sense voltage $V_{SENSE}$ may be dependent upon the peak magnitude $I_{PK}$ of the load current $I_{LOAD}$ and the drain-source on resistance $R_{DS-ON}$ of the FET Q262. The current feedback circuit 264 may comprise a first controllable switch 272 that receives the sense voltage $V_{SENSE}$. The first controllable switch 272 may be rendered conductive and non-conductive in response to a feedback window control signal $V_{WIN}$ (e.g., a switch control signal) generated by the control circuit 280. The first controllable switch 272 may be coupled to a filter circuit, which may comprise a capacitor C274 and a resistor R276. The feedback signal $V_{FB}$ may be generated across the capacitor C274. The current feedback circuit 264 may also comprise a second controllable switch 278 coupled in parallel with the capacitor C274. The second controllable switch 278 may be rendered conductive and non-conductive in response to a reset control signal $V_{RST}$ generated by the control circuit 280.

The control circuit 280 may be configured to control the first controllable switch 272 of the current feedback circuit 264 to be conductive during the on-time $T_{ON}$ of the drive signal $V_{DR}$ (e.g., when the FET Q262 is conductive). After the first controllable switch 272 is rendered conductive at the beginning of the on-time $T_{ON}$, the capacitor C274 may charge to approximately the peak magnitude $V_{PK}$ of the sense voltage $V_{SENSE}$ through the resistor R276, such that the magnitude of the current feedback signal $V_{FB}$ may indicate the peak magnitude $I_{PK}$ of the load current $I_{LOAD}$. The control circuit 280 may receive the current feedback signal $V_{FB}$ generated by the current feedback circuit 264, and may sample the current feedback signal $V_{FB}$ during the on-time $T_{ON}$ (e.g., for the entirety of the on-time $T_{ON}$ or during a portion of the on-time $T_{ON}$) of the drive signal $V_{DR}$ to determine the peak magnitude $I_{PK}$ of the load current $I_{LOAD}$.

The control circuit 280 may calculate the peak magnitude $I_{PK}$ of the load current $I_{LOAD}$ using the sampled magnitude of the current feedback signal $V_{FB}$ and the drain-source on resistance $R_{DS-ON}$ of the FET Q262, e.g., $I_{PK}=V_{FB}/R_{DS-ON}$. For example, the control circuit 280 may store the drain-source on resistance $R_{DS-ON}$ of the FET Q262 in memory and may retrieve the drain-source on resistance $R_{DS-ON}$ from memory in order to calculate the peak magnitude $I_{PK}$ of the load current $I_{LOAD}$ (e.g., the drain-source on resistance $R_{DS-ON}$ may be a fixed or constant value). In addition, the drain-source on resistance $R_{DS-ON}$ may be dependent upon a present temperature $T_{PRES}$ of the FET Q212. For example, the control circuit 280 may be configured to determine the present temperature $T_{PRES}$ of the FET Q212 using a temperature measuring circuit and/or a temperature sensing device located near the FET Q212. The control circuit 280 may also be configured to estimate the present temperature $T_{PRES}$ of the FET Q212 based on one or more operating parameters of the electrical device 250, such as the peak magnitude $I_{PK}$ of the load current $I_{LOAD}$ and/or the sense voltage $V_{SENSE}$ developed across the FET Q262. The control circuit 280 may be configured to determine the drain-source on resistance $R_{DS-ON}$ of the FET Q262 based on the determined present temperature $T_{PRES}$ of the FET Q212 using a predetermined relationship between the drain-source on resistance $R_{DS-ON}$ and the present temperature $T_{PRES}$ of the FET Q212. For example, the predetermined relationship between the drain-source on resistance $R_{DS-ON}$ and the present temperature $T_{PRES}$ of the FET Q212 may be stored in memory as a lookup table and/or a function (e.g., equation). The control circuit 280 may calculate the peak magnitude $I_{PK}$ of the load current $I_{LOAD}$ using the determined drain-source on resistance $R_{DS-ON}$ of the FET Q262. For example, the predetermined relationship between the drain-source on resistance $R_{DS-ON}$ and the present temperature $T_{PRES}$ and/or an initial value of the drain-source on resistance $R_{DS-ON}$ may be calibrated during a manufacturing procedure of the electrical device 250.

The control circuit 280 may render the first controllable switch 272 non-conductive at or before the end of the on-time $T_{ON}$. After the end of the on-time $T_{ON}$, the control circuit 280 may render the second controllable switch 278 conductive for a reset period $T_{RST}$ (e.g., a reset pulse) in order to discharge the capacitor C274 so that the current feedback circuit 264 may control the magnitude of the current feedback signal $V_{FB}$ to indicate the peak magnitude $I_{PK}$ of the load current $I_{LOAD}$ during a subsequent cycle (e.g., the next cycle) of the LED drive circuit 260.

During each cycle of control of the LED drive circuit 260, the control circuit 280 may be configured to render the FET Q262 conductive for a first portion (e.g., an on-time $T_{ON}$) of the cycle and non-conductive for a second portion (e.g., an off-time $T_{OFF}$) of the cycle. For example, the control circuit 250 may be configured to adjust the average magnitude of the load current $I_{LOAD}$ by adjusting a duty cycle DC of the drive signal $V_{DR}$, e.g., $DC=T_{ON}/T_{OP}=T_{ON}/(T_{ON}+T_{OFF})$. The control circuit 280 may be configured to determine the on-time $T_{ON}$ for the drive signal $V_{DR}$ (e.g., for a present cycle of the LED drive circuit 260) based on the target intensity $L_{TRGT}$ of the LED light source 252 (e.g., using open loop control). Since the FET Q212 is controlled as a switching device and is rendered conductive (e.g., controlled into the saturation region) during the on-time $T_{ON}$ of the drive signal $V_{DR}$, the load current $I_{LOAD}$ may be characterized by an on-time that is the same length as the on-time $T_{ON}$ of the drive signal $V_{DR}$. The FET Q262 may conduct the load current $I_{LOAD}$ at the peak magnitude $I_{PK}$ during the on-time. The control circuit 280 may be configured to determine a length of the operating period $T_{OP}$ of the drive signal $V_{DR}$ for the present cycle of the LED drive circuit 260 in response to the peak magnitude $I_{PK}$ of the load current $I_{LOAD}$ as determined from the current feedback signal $V_{FB}$ (e.g., using closed loop control). The control circuit 280 may not control the peak magnitude $I_{PK}$ of the load current $I_{LOAD}$ during the on-time using closed loop control (e.g., to regulate the peak magnitude $I_{PK}$ towards a target peak current by comparing the peak current $I_{PK}$ to a threshold).

The control circuit 280 may also be configured to generate a bus control signal $V_{BUS-CNTL}$ that may be received by the power converter circuit for adjusting the magnitude of the bus voltage $V_{BUS}$. The control circuit 280 may be configured to maintain the bus control signal $V_{BUS-CNTL}$ constant (e.g., substantially constant) during each cycle of the LED drive circuit 260. The control circuit 280 may be configured to control the bus control signal $V_{BUS-CNTL}$ to adjust the magnitude from one cycle to the next (e.g., as will be described in greater detail below with reference to FIGS. 6B and 6C). Since the FET Q262 is driven into the saturation region during the on-time $T_{ON}$, the peak magnitude $I_{PK}$ of the load current $I_{LOAD}$ during the on-time $T_{ON}$ may be dependent upon the magnitude of the bus voltage $V_{BUS}$, the drain-source on resistance $R_{DS-ON}$, and the characteristics of the LED light source 252 (e.g., the equivalent resistance of the LED light source). Since the control circuit 280 is not able to adjust the drain-source on resistance $R_{DS-ON}$ and the characteristics of the LED light source 252, and the magnitude of the bus voltage $V_{BUS}$ remains constant during each cycle of the LED driver circuit 260, the control circuit 280 may not be able to control the peak magnitude $I_{PK}$ of the load current $I_{LOAD}$ during the present cycle. The peak magnitude $I_{PK}$ of the load current $I_{LOAD}$ may be different for different LED light sources that may be controlled by the LED drive circuit 260 (e.g., the peak magnitude $I_{PK}$ may not be deterministic). Accordingly, the peak magnitude $I_{PK}$ of the load current $I_{LOAD}$ may be considered an uncontrolled or unregulated magnitude (e.g., an uncontrolled or unregulated current). Since the control circuit 280 does not control the peak magnitude $I_{PK}$ of the load current $I_{LOAD}$ during the on-time using closed loop control (e.g., to regulate the peak magnitude $I_{PK}$ towards a target peak current), the peak magnitude $I_{PK}$ of the load current $I_{LOAD}$ may not be dependent upon the operation of the control circuit 280 during the present cycle (e.g., during the on-time). If the control circuit 280 used closed loop control to control the peak magnitude $I_{PK}$ during the on-time, the peak magnitude $I_{PK}$ would be the same (e.g., controlled to the target peak current) independent of the particular LED light source controlled by the LED drive circuit 260.

The control circuit 280 may be configured to control the average magnitude of the load current $I_{LOAD}$ by adjusting the operating period $T_{OP}$ for the present cycle of the drive signal $V_{DR}$. The control circuit may be configured to determine the operating period $T_{OP}$ for the present cycle of the drive signal $V_{DR}$ in response to the peak magnitude $I_{PK}$ of the load current $I_{LOAD}$ (e.g., an uncontrolled magnitude) as determined from the current feedback signal $V_{FB}$. For example, the control circuit 280 may be configured to calculate the operating period $T_{OP}$ required to achieve the target current $I_{TRGT}$ (e.g., the average magnitude of the load current $I_{LOAD}$) at the present on-time $T_{ON}$ and the present peak magnitude $I_{PK}$ of the load current $I_{LOAD}$ (e.g., as determined from the current feedback signal $V_{FB}$), e.g., $T_{OP}=(I_{PK}\cdot T_{ON})/I_{TRGT}$. The off-time $T_{OFF}$ of the drive signal may be dependent upon the determined operating period $T_{OP}$, e.g., $T_{OFF}=T_{OP}-T_{ON}$. The control circuit may render the FET conductive at the end of the operating period $T_{OP}$ (e.g., the end of the present off-time $T_{OFF}$) to start the next cycle.

Figure 3:
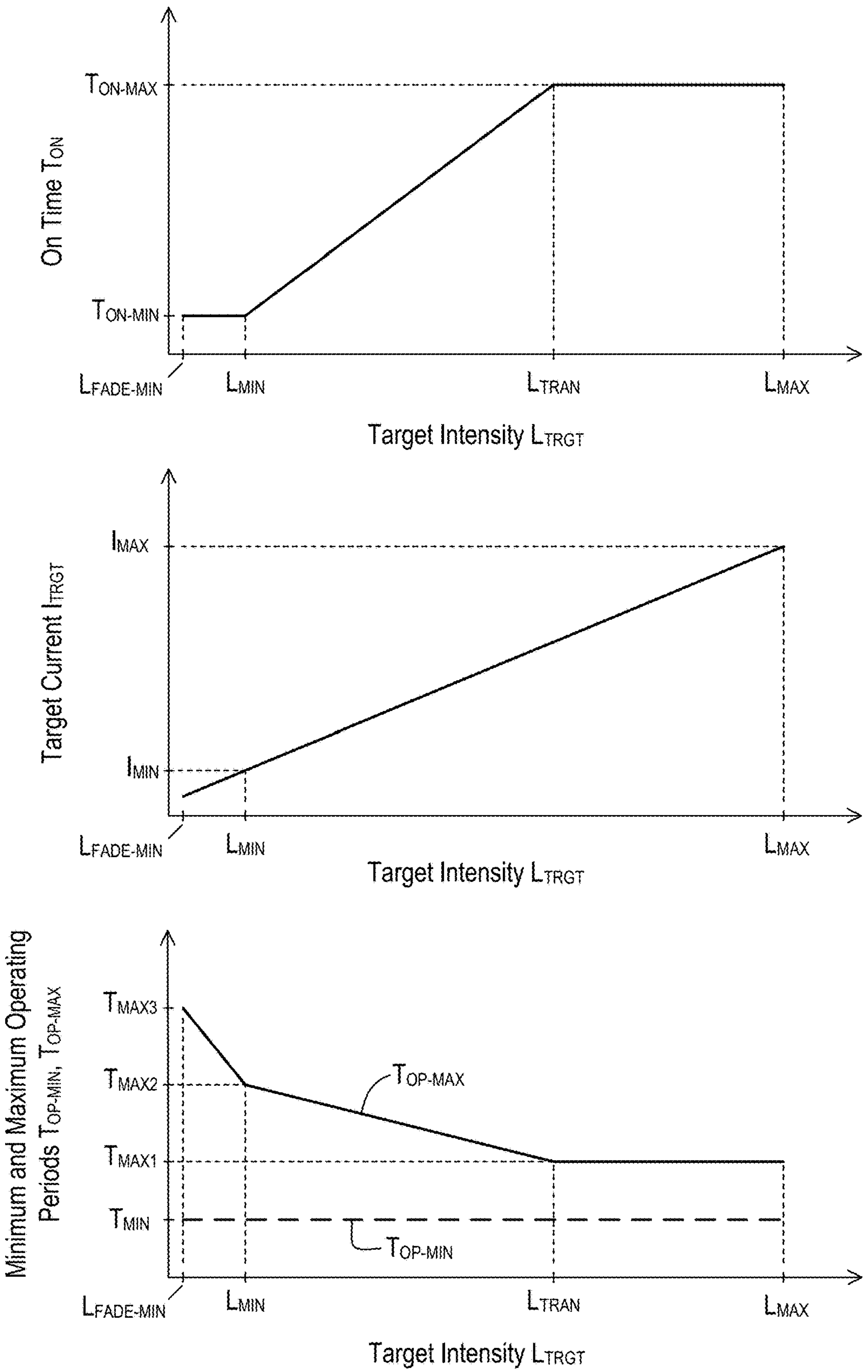
FIG. 3 shows example plots of the relationships between various operating parameters and a target intensity of the controllable light source of FIG. 2.

FIG. 3 shows plots illustrating controls relationships that may be utilized by a control circuit (e.g., the control circuits 150, 230, 280) to control an LED drive circuit (e.g., the LED drive circuits 13, 140 of FIG. 1, the LED drive circuit 210 of FIG. 2A, and/or the LED drive circuit 260 of FIG. 2B). FIG. 3 shows a plot of an example relationship between an on-time $T_{ON}$ of the drive signal $V_{DR}$ and a target intensity $L_{TRGT}$ of the LED drive circuit. When the target intensity $L_{TRGT}$ is greater than (e.g., greater than or equal to) a transition intensity $L_{TRAN}$ (e.g., between the transition intensity $L_{TRAN}$ and the maximum intensity $L_{MAX}$), the on-time $T_{ON}$ may be set to a maximum on-time $T_{ON-MAX}$. When the target intensity $L_{TRGT}$ is less than (e.g., less than or equal to) the minimum intensity $L_{MIN}$ (e.g., between the minimum intensity $L_{MIN}$ and the minimum fading intensity $L_{FADE-MIN}$), the on-time $T_{ON}$ may be set to a minimum on-time $T_{ON-MIN}$. When the target intensity $L_{TRGT}$ is between the minimum intensity $L_{MIN}$ and the transition intensity $L_{TRAN}$, the on-time $T_{ON}$ may be adjusted (e.g., linearly adjusted between the minimum on-time $T_{ON-MIN}$ and the maximum on-time $T_{ON-MAX}$) with respect to the target intensity $L_{TRGT}$ (e.g., as shown in FIG. 3).

The control circuit may be configured to determine a target current $I_{TRGT}$ (e.g., a target average magnitude of the load current $I_{LOAD}$) for the LED light source in response to the target intensity $L_{TRGT}$. FIG. 3 also shows a plot of an example relationship between the target current $I_{TRGT}$ and the target intensity $L_{TRGT}$ of the LED drive circuit. As shown in FIG. 3, the target current $I_{TRGT}$ may be linearly dependent upon the target intensity $L_{TRGT}$ and may range between a minimum current $I_{MIN}$ (e.g., at the minimum intensity $L_{MIN}$) and a maximum current $I_{MAX}$ (e.g., at the maximum intensity $L_{MAX}$). In addition, the relationship between the target current $I_{TRGT}$ and the target intensity $L_{TRGT}$ may be a non-linear relationship.

The control circuit may be configured to control the average magnitude of the load current $I_{LOAD}$ by adjusting the operating period $T_{OP}$ for the present cycle of the drive signal $V_{DR}$. The control circuit may be configured to determine the operating period $T_{OP}$ for the present cycle of the drive signal $V_{DR}$ in response to the peak magnitude $I_{PK}$ of the load current $I_{LOAD}$ (e.g., an uncontrolled magnitude) as determined from the current feedback signal $V_{FB}$. For example, the control circuit may be configured to calculate the operating period $T_{OP}$ required to achieve the target current $I_{TRGT}$ (e.g., average current) at the present on-time $T_{ON}$ and the present peak magnitude $I_{PK}$ of the load current $I_{LOAD}$ (e.g., as determined from the current feedback signal $V_{FB}$), e.g., $T_{OP}=(I_{PK}\cdot T_{ON})/I_{TRGT}$. The off-time $T_{OFF}$ of the drive signal may be dependent upon the determined operating period $T_{OP}$, e.g., $T_{OFF}=T_{OP}-T_{ON}$. The control circuit may render the FET conductive at the end of the operating period $T_{OP}$ (e.g., the end of the present off-time $T_{OFF}$) to start the next cycle.

The control circuit may be configured to control the bus control signal $V_{BUS-CNTL}$ to adjust the bus voltage $V_{BUS}$ to attempt to maintain the operating period $T_{OP}$ between a minimum operating period $T_{OP-MIN}$ and a maximum operating period $T_{OP-MAX}$. When the operating period $T_{OP}$ (e.g., as determined by the control circuit in dependence upon the peak magnitude $I_{PK}$ of the load current $I_{LOAD}$) is less than the minimum operating period $T_{OP-MIN}$, the control circuit may be configured to increase the magnitude of the bus voltage $V_{BUS}$. Increasing the peak magnitude $I_{PK}$ of the load current $I_{LOAD}$ may cause the control circuit to increase the operating period $T_{OP}$ (e.g., such that the operating period $T_{OP}$ may be greater than the minimum operating period $T_{OP-MIN}$). When the operating period $T_{OP}$ is greater than the maximum operating period $T_{OP-MAX}$, the control circuit may be configured to decrease the magnitude of the bus voltage $V_{BUS}$ (e.g., to decrease the peak magnitude $I_{PK}$ of the load current $I_{LOAD}$). Decreasing the peak magnitude $I_{PK}$ of the load current $I_{LOAD}$ may cause the control circuit to decrease the operating period $T_{OP}$ (e.g., such that the operating period $T_{OP}$ may be less than the maximum operating period $T_{OP-MAX}$).

The minimum operating period $T_{OP-MIN}$ and the maximum operating period $T_{OP-MAX}$ may be constant values and/or variable values that are dependent upon the target intensity $L_{TRGT}$. FIG. 3 also shows a plot of an example relationship between the minimum and maximum operating periods $T_{OP\text{-}MIN}$, $T_{OP\text{-}MAX}$ and the target intensity $L_{TRGT}$. The minimum operating period $T_{OP\text{-}MIN}$ may be a minimum value $T_{MIN}$ (e.g., a constant value such as 10 microseconds, which may be independent of the target intensity $L_{TRGT}$). When the target intensity $L_{TRGT}$ is greater than (e.g., greater than or equal to) the transition intensity $L_{TRAN}$ (e.g., between the transition intensity $L_{TRAN}$ and the maximum intensity $L_{MAX}$), the maximum operating period $T_{OP\text{-}MAX}$ may be set to a first maximum value $T_{MAX1}$ (e.g., a constant value independent of the target intensity $L_{TRGT}$). When the target intensity $L_{TRGT}$ is between the minimum intensity $L_{MIN}$ and the transition intensity $L_{TRAN}$, the maximum operating period $T_{OP\text{-}MAX}$ may be a variable value that is dependent upon the target intensity $L_{TRGT}$. For example, the maximum operating period $T_{OP\text{-}MAX}$ may be adjusted between the first maximum value $T_{MAX1}$ and a second maximum value $T_{MAX2}$, and may be linearly related to the target intensity $L_{TRGT}$ when the target intensity $L_{TRGT}$ is between the minimum intensity $L_{MIN}$ and the transition intensity $L_{TRAN}$. As shown in FIG. 3, the maximum operating period $T_{OP\text{-}MAX}$ may increase from the first maximum value $T_{MAX1}$ to the second maximum value $T_{MAX2}$ as the target intensity $L_{TRGT}$ decreases from the transition intensity $L_{TRAN}$ to the minimum intensity $L_{MIN}$. When the target intensity $L_{TRGT}$ is less than (e.g., less than or equal to) the minimum intensity $L_{MIN}$ (e.g., between the minimum intensity $L_{MIN}$ and the minimum fading intensity $L_{FADE\text{-}MIN}$), the maximum operating period $T_{OP\text{-}MAX}$ may be a variable value that is dependent upon the target intensity $L_{TRGT}$. For example, the maximum operating period $T_{OP\text{-}MAX}$ may be adjusted between the second maximum value $T_{MAX2}$ and a third maximum value $T_{MAX3}$, and may be linearly related to the target intensity $L_{TRGT}$ when the target intensity $L_{TRGT}$ is less than the minimum intensity $L_{MIN}$. As shown in FIG. 3, the maximum operating period $T_{OP\text{-}MIN}$ may increase from the second maximum value $T_{MAX2}$ to the third maximum value $T_{MAX3}$ as the target intensity $L_{TRGT}$ decreases from the minimum intensity $L_{MIN}$ to the minimum fading intensity $L_{FADE\text{-}MIN}$. The values for $T_{MAX1}$, $T_{MAX2}$, and $T_{MAX3}$ may vary in accordance with the target intensity $L_{TRGT}$. For instance, $T_{MAX3}$ may have a value of 800 microseconds in some scenarios.

When the target intensity $L_{TRGT}$ is greater than the transition intensity $L_{TRAN}$, the on-time $T_{ON}$ of the drive signal $V_{DR}$ may be set to a constant value (e.g., the maximum on-time $T_{ON\text{-}MAX}$ as shown in FIG. 3). In addition, when the target intensity $L_{TRGT}$ is greater than the transition intensity $L_{TRAN}$ (e.g., near the maximum intensity $L_{MAX}$), the operating period $T_{OP}$ of the drive signal $V_{DR}$ may be controlled to approximately the minimum value $T_{MIN}$ (e.g., a constant value as shown in FIG. 3). As the target intensity $L_{TRGT}$ is adjusted near the maximum intensity $L_{MAX}$ (e.g., above the transition intensity $L_{TRAN}$), the control circuit may adjust the magnitude of the bus voltage $V_{BUS}$ (e.g., and thus the peak magnitude $I_{PK}$ of the load current $I_{LOAD}$) to attempt to maintain the operating period $T_{OP}$ of the drive signal $V_{DR}$ greater than the minimum operating period $T_{OP\text{-}MIN}$ (e.g., the minimum value $T_{MIN}$). As a result, the operating period $T_{OP}$ of the drive signal $V_{DR}$ may be approximately constant (e.g., approximately equal to the minimum value $T_{MIN}$) with respect to the target intensity $L_{TRGT}$ when the target intensity $L_{TRGT}$ is greater than the transition intensity $L_{TRAN}$ and near the maximum intensity $L_{MAX}$. In addition, the peak magnitude $I_{PK}$ of the load current $I_{LOAD}$ may be monotonically related (e.g., approximately linearly related) to the target current $I_{TRGT}$ when the target intensity $L_{TRGT}$ is greater than the transition intensity $L_{TRAN}$. For example, as the target intensity $L_{TRGT}$ decreases from the maximum intensity $L_{MAX}$ towards the transition intensity $L_{TRAN}$, the peak magnitude $I_{PK}$ of the load current $I_{LOAD}$ may also decrease, and vice versa. As the target intensity $L_{TRGT}$ continues to decrease towards the transition intensity $L_{TRAN}$, the operating period $T_{OP}$ may increase above the minimum operating period $T_{OP\text{-}MIN}$ (e.g., the minimum value $T_{MIN}$), but still be limited below the maximum operating period $T_{OP\text{-}MAX}$ (e.g., the first maximum value $T_{MAX1}$).

Figure 4:
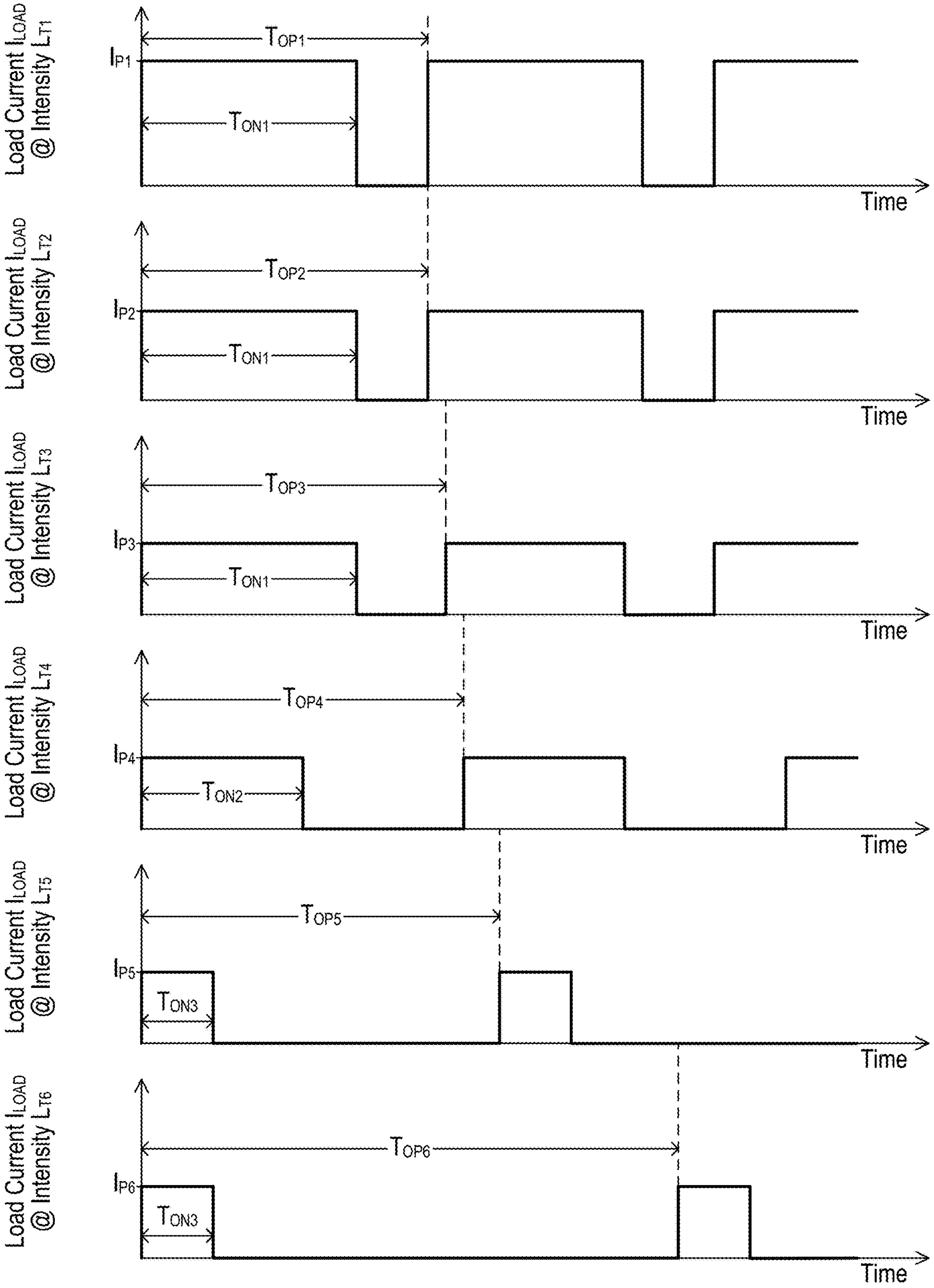
FIG. 4 shows example waveforms of a load current illustrating the operation of a controllable lighting device at various target intensities.

FIG. 4 shows example waveforms of a load current $I_{LOAD}$ illustrating the operation of a controllable lighting device (e.g., the lighting control devices 100 and/or the electrical devices 200, 250) at various target intensities $L_{T1}$-$L_{T6}$. When the target intensity $L_{TRGT}$ is at a first target intensity $L_{T1}$ (e.g., at or near the maximum intensity $L_{MAX}$), a control circuit (e.g., the control circuits 150, 230, 280) may set the on-time $T_{ON}$ of the drive signal $V_{DR}$ to a first on-time $T_{ON1}$ (e.g., the maximum on-time $T_{ON\text{-}MAX}$ as shown in FIG. 3), which may result in the load current having an on-time of the same length as the first on-time $T_{ON1}$. The load current $I_{LOAD}$ may be characterized by a first peak magnitude $I_{P1}$ during the first on-time $T_{ON1}$. The control circuit may control the operating period $T_{OP}$ of the drive signal $V_{DR}$ such that the load current $I_{LOAD}$ has a first operating period $T_{OP1}$ (e.g., in dependence upon the first peak magnitude $I_{P1}$ of the load current $I_{LOAD}$ during the first on-time $T_{ON1}$ as described above). For example, the first operating period $T_{OP1}$ may be the minimum operating period $T_{OP\text{-}MIN}$ (e.g., the minimum value $T_{MIN}$).

When the target intensity $L_{TRGT}$ is decreased to a second target intensity $L_{T2}$ (e.g., that is less than the first target intensity $L_{T1}$ and greater than the transition intensity $L_{TRAN}$), the load current $I_{LOAD}$ may still have the first on-time $T_{ON1}$ (e.g., the maximum on-time $T_{ON\text{-}MAX}$ as shown in FIG. 3). The load current $I_{LOAD}$ may be characterized by a second peak magnitude $I_{P2}$ during the first on-time $T_{ON1}$ at the second target intensity $L_{T2}$. The load current $I_{LOAD}$ may have a second operating period $T_{OP2}$ at the second target intensity $L_{T2}$. Since the operating period $T_{OP}$ of the drive signal $V_{DR}$ may be approximately constant when the target intensity $L_{TRGT}$ is greater than the transition intensity $L_{TRAN}$, the second operating period $T_{OP2}$ of the load current $I_{LOAD}$ at the second target intensity $L_{T2}$ may be approximately the same as the first operating period $T_{OP1}$ of the load current $I_{LOAD}$ at the first target intensity $L_{T1}$. For example, the second operating period $T_{OP2}$ may be the minimum operating period $T_{OP\text{-}MIN}$ (e.g., the minimum value $T_{MIN}$). In addition, since the peak magnitude $I_{PK}$ of the load current $I_{LOAD}$ may be monotonically related (e.g., approximately linearly related) to the target current $I_{TRGT}$ when the target intensity $L_{TRGT}$ is greater than the transition intensity $L_{TRAN}$, the peak magnitude $I_{PK}$ of the load current $I_{LOAD}$ may decrease from the first peak magnitude $I_{P1}$ to the second peak magnitude $I_{P2}$ in response to the target intensity $L_{TRGT}$ decreasing from the first target intensity $L_{T1}$ to the second target intensity $L_{T2}$.

When the target intensity $L_{TRGT}$ is decreased to a third target intensity $L_{T3}$ (e.g., approximately equal to the transition intensity $L_{TRAN}$), the load current $I_{LOAD}$ may still have the first on-time $T_{ON1}$ (e.g., the maximum on-time $T_{ON\text{-}MAX}$ as shown in FIG. 3). The peak magnitude $I_{PK}$ of the load current $I_{LOAD}$ may decrease to a third peak magnitude $I_{P3}$ during the first on-time $T_{ON1}$ when at the third target intensity $L_{T3}$. The load current $I_{LOAD}$ may have a third operating period $T_{OP3}$ at the third target intensity $L_{T3}$, which may be greater than the first operating period $T_{OP1}$ at the first target intensity $L_{T1}$ and/or the second operating period $T_{OP2}$ at the second target intensity $L_{T2}$ (e.g., may be between the minimum value $T_{MIN}$ and the maximum value $T_{MAX}$).

When the target intensity $L_{TRGT}$ is decreased to a fourth target intensity $L_{T4}$ (e.g., less than the transition intensity $L_{TRAN}$ and greater than the minimum intensity $L_{MIN}$), the load current $I_{LOAD}$ may have a second on-time $T_{ON2}$, which may be less than the first on-time $T_{ON1}$ (e.g., linearly dependent upon the target intensity $L_{TRGT}$ as shown in FIG. 3). The load current $I_{LOAD}$ may be characterized by a fourth peak magnitude $I_{P4}$ (e.g., which may be approximately equal to the third peak magnitude $I_{PK3}$). Since the maximum operating period $T_{OP-MAX}$ increases from the first maximum value $T_{MAX1}$ towards the second maximum value $T_{MAX2}$ as the target intensity $L_{TRGT}$ decreases below the transition intensity $L_{TRAN}$ (e.g., as shown in FIG. 3), the load current $I_{LOAD}$ may have a fourth operating period $T_{OP4}$, which may be greater than the third operating period $T_{OP3}$.

When the target intensity $L_{TRGT}$ is decreased to a fifth target intensity $L_{T5}$ (e.g., approximately equal to the minimum intensity $L_{MIN}$), the load current $I_{LOAD}$ may be set to a third on-time $T_{ON3}$ (e.g., the minimum on-time $T_{ON-MIN}$ as shown in FIG. 3). The load current $I_{LOAD}$ may be characterized by a fifth peak magnitude $I_{P5}$ (e.g., which may be approximately equal to the third peak magnitude $I_{PK3}$ and/or the fourth peak magnitude $I_{P4}$). The load current $I_{LOAD}$ may have a fifth operating period $T_{OP5}$, which may be greater than the fourth operating period $T_{OP4}$.

When the target intensity $L_{TRGT}$ is decreased to a sixth target intensity $L_{T6}$ (e.g., less than the minimum intensity $L_{MIN}$ and greater than the minimum fading intensity $L_{FADE-MIN}$), the load current $I_{LOAD}$ may be still set to the third on-time $T_{ON3}$ (e.g., the minimum on-time $T_{ON-MIN}$ as shown in FIG. 3). The load current $I_{LOAD}$ may be characterized by a sixth peak magnitude $I_{P6}$ (e.g., which may be approximately equal to the third peak magnitude $I_{PK3}$, the fourth peak magnitude $I_{P4}$, and/or the fifth peak magnitude $I_{P5}$). The load current $I_{LOAD}$ may have a sixth operating period $T_{OP6}$, which may be greater than the fifth operating period $T_{OP5}$.

Figure 5:
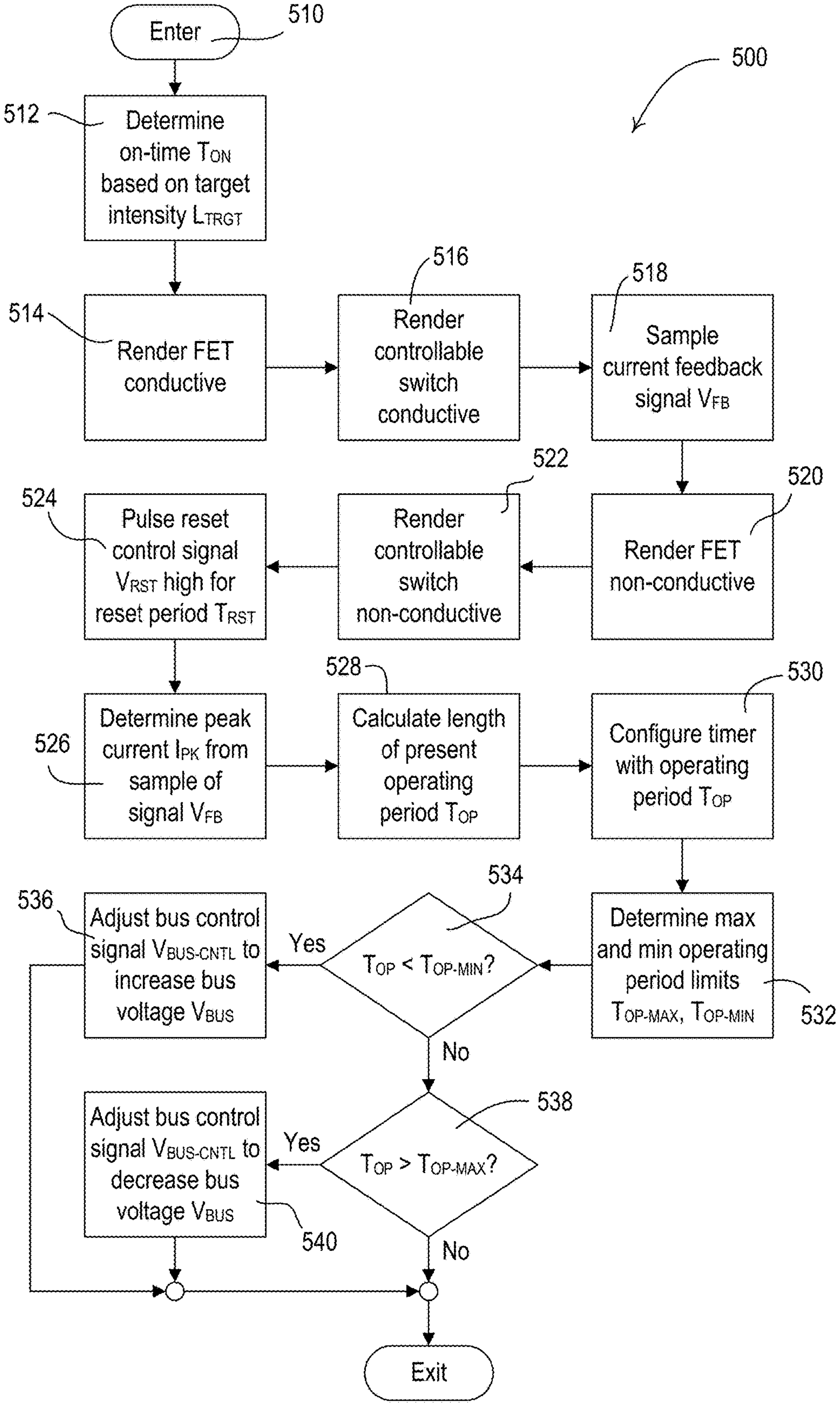
FIG. 5 is a simplified flow diagram of an example control procedure for controlling a controllable light source.
Figure 6A:
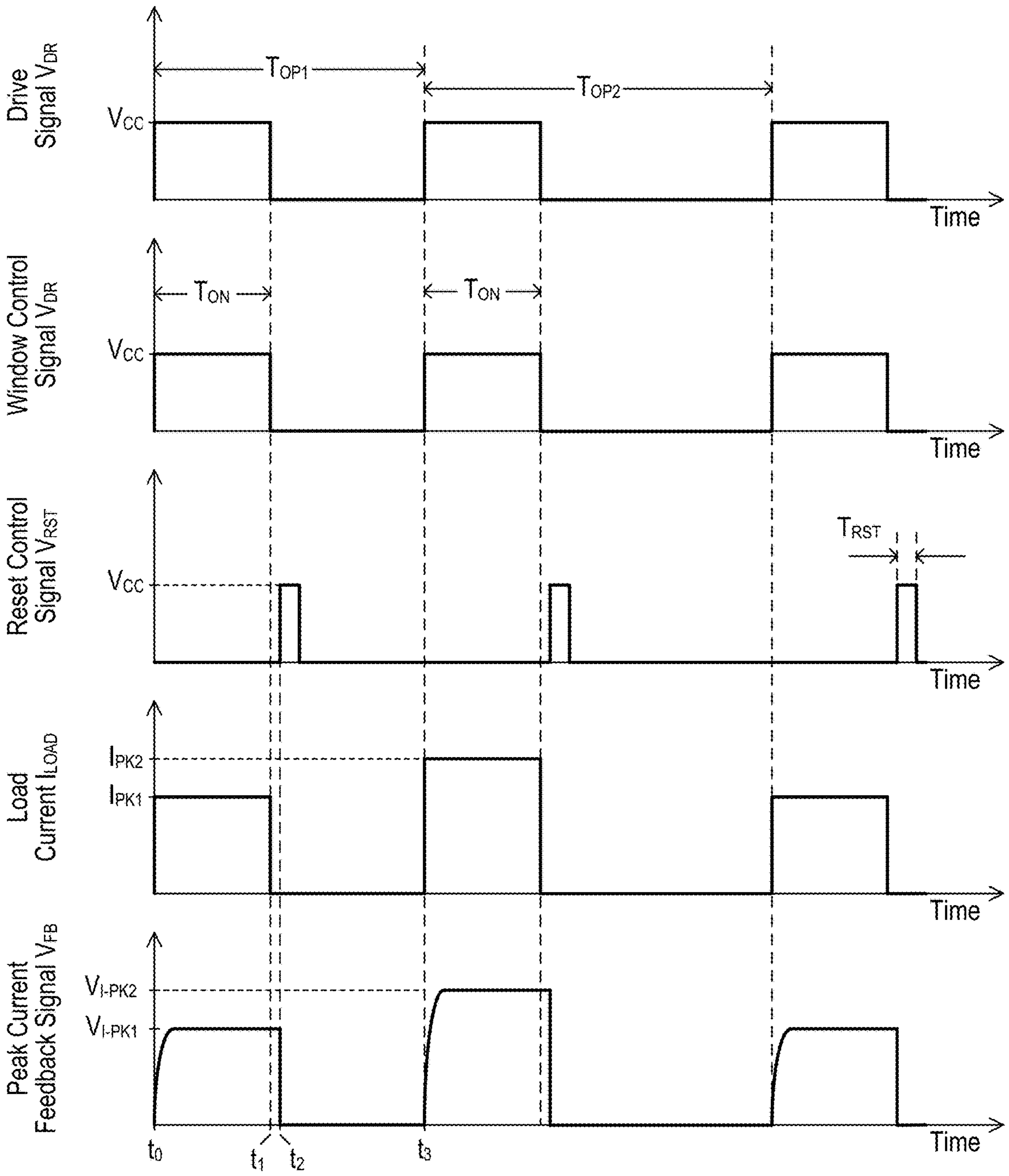
FIGS. 6A-6C show example waveforms illustrating the operation of a during the controllable lighting device during execution of the control procedure of FIG. 5.
Figure 6B:
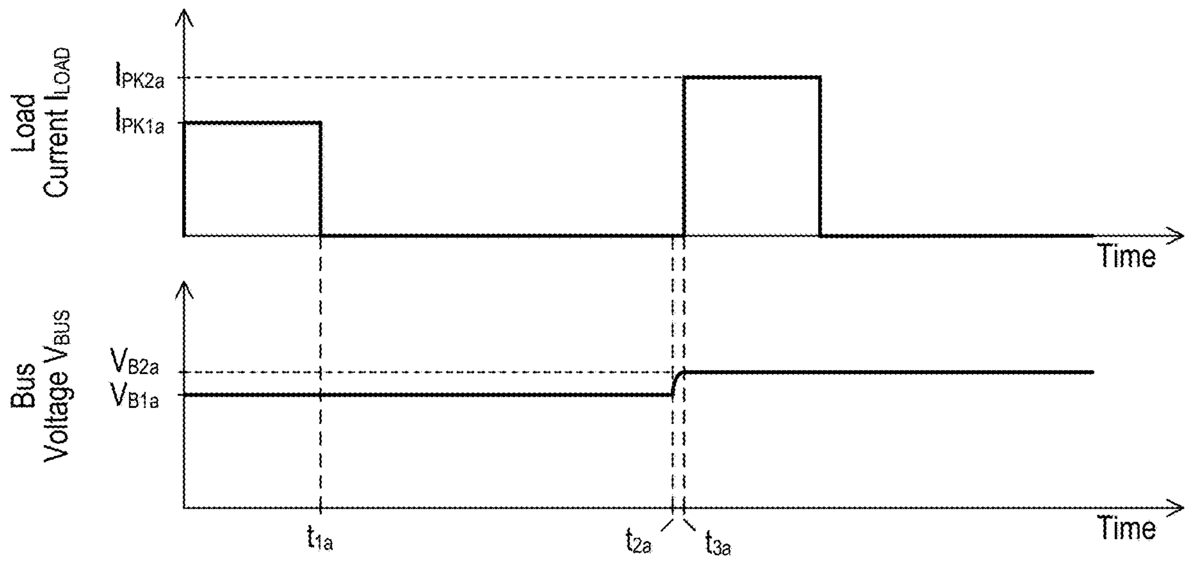
Figure 6C:
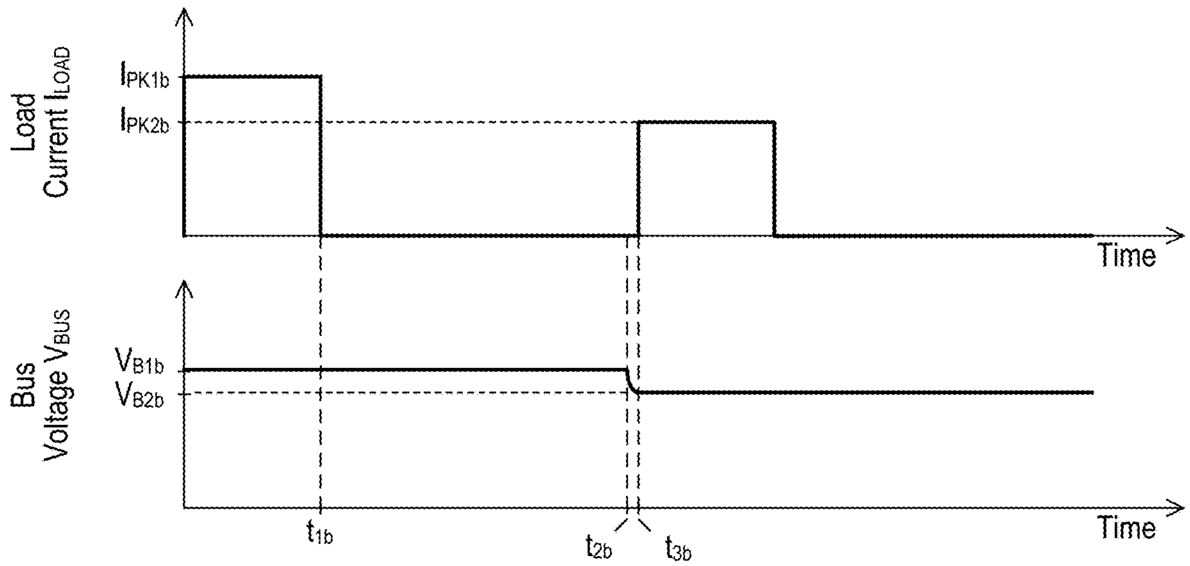

FIG. 5 is a simplified flow diagram of an example control procedure 500 that may be executed by a control circuit (e.g., the control circuits 150, 230, 280) of a controllable lighting device (e.g., the lighting control device 100 and/or the electrical devices 200, 250) for controlling an LED light source (e.g., the LED light sources 102, 104, 202, 252). FIGS. 6A-6C show example waveforms illustrating the operation of the controllable lighting device while the control circuit is executing the control procedure 500. The control circuit may generate a drive signal $V_{DR}$ for rendering a FET (e.g., the FETs Q132, Q142, Q212) of an LED drive circuit (e.g., the LED drive circuits 130, 140, 210, 260) conductive and non-conductive during each cycle of control of the LED drive circuit. The control circuit may receive a current feedback signal $V_{FB}$ from a current feedback circuit (e.g., the current feedback circuits 134, 144, 214, 264), where the magnitude of the current feedback signal $V_{FB}$ may indicate a magnitude (e.g., a peak magnitude) of a load current $I_{LOAD}$ conducted through the LED light source. The control circuit may control the LED drive circuit to control an intensity of the LED light source towards a target intensity $L_{TRGT}$. The waveforms of FIGS. 6A-6C illustrate the operation of the controllable lighting device when the target intensity $L_{TRGT}$ is constant.

The control procedure 500 may be executed by the control circuit at step 510, for example, at the beginning of each cycle of control of the LED drive circuit (e.g., periodically). For example, the period of execution of the control procedure 500 may be set during a previous (e.g., preceding) execution of the control procedure 500. At 512, the control circuit may determine an on-time $T_{ON}$ of the drive signal $V_{DR}$ based on the target intensity $L_{TRGT}$ (e.g., as shown in FIG. 3). The on-time $T_{ON}$ may be determined based on predetermined and/or stored values or may be calculated by the control circuit based on the target intensity $L_{TRGT}$. At 514, the control circuit may render the FET of the LED drive circuit conductive at the beginning of the present cycle of control of the LED drive circuit. For example, the control circuit may render the FET conductive at 514 by driving the drive signal $V_{DR}$ high towards the supply voltage $V_{CC}$ (e.g., as shown at $t_0$ in FIG. 6A). After the FET is rendered conductive, the LED light source may conduct the load current $I_{LOAD}$ through the FET and the load current $I_{LOAD}$ may have a peak magnitude $I_{PK}$ during the on-time $T_{ON}$ (e.g., a first peak magnitude $I_{PK1}$ as shown in FIG. 6A).

At 516, the control circuit may also render a first controllable switch (e.g., the controllable switches 222, 272) of the current feedback circuit conductive at the beginning of the present cycle or slightly after the beginning of the present cycle to cause the magnitude of the current feedback signal $V_{FB}$ to indicate the peak magnitude $I_{PK}$ (e.g., the first peak magnitude $I_{PK1}$) of the load current $I_{LOAD}$ during the present cycle. For example, the control circuit may drive a window control signal $V_{WIN}$ high towards the supply voltage $V_{CC}$ (e.g., as shown at $t_0$ in FIG. 6A) to render the first controllable switch conductive at 516. After the first controllable switch is rendered conductive, a capacitor of the current feedback circuit (e.g., the capacitors C224, C274) may charge and the magnitude of the current feedback signal $V_{FB}$ may increase to a first feedback level $V_{I-PK1}$, which may indicate the first peak magnitude $I_{PK1}$ of the load current $I_{LOAD}$.

At 518, the control circuit may sample the current feedback signal $V_{FB}$ for later use in determining the peak magnitude $I_{PK}$ of the load current $I_{LOAD}$ (e.g., the first peak magnitude $I_{PK1}$). For example, the control circuit may sample the current feedback signal $V_{FB}$ near the end of the on-time $T_{ON}$ (e.g., before time $t_1$ as shown in FIG. 6A). At 520, the control circuit may drive the drive signal $V_{DR}$ low towards circuit common to render the FET non-conductive, such that the FET stops conducting the load current $I_{LOAD}$ (e.g., as shown at time $t_1$ in FIG. 6A). At 522, the control circuit may drive the window control signal $V_{WIN}$ low towards circuit common to render the first controllable switch of the current feedback circuit non-conductive (e.g., as shown at time $t_1$ in FIG. 6A). At 524, the control circuit may be configured to render a second controllable switch (e.g., the controllable switches 228, 278) conductive to discharge the capacitor of the current feedback circuit. For example, the control circuit may drive a reset control signal $V_{RST}$ high towards the supply voltage $V_{CC}$ for a reset period $T_{RST}$ (e.g., to generate a reset pulse) to render the second controllable switch conductive for the length of the reset period $T_{RST}$ (e.g., as shown at time $t_2$ of FIG. 6A).

At 526, the control circuit may be configured to determine the peak magnitude $I_{PK}$ (e.g., the first peak magnitude $I_{PK1}$) of the load current $I_{LOAD}$ based on the sampled magnitude of the current feedback signal $V_{FB}$ (e.g., as determined at 518). For example, the control circuit may calculate the peak magnitude $I_{PK}$ of the load current $I_{LOAD}$ using the sampled magnitude of the current feedback signal $V_{FB}$ and a resistance of a sense resistor (e.g., the resistance $R_{SENSE}$ of the sense resistor R220 of the LED drive circuit 210 shown in FIG. 2A), which may be stored in memory. In addition, the control circuit may calculate the peak magnitude $I_{PK}$ of the load current $I_{LOAD}$ using the sampled magnitude of the current feedback signal $V_{FB}$ and a drain-source on resistance of a FET of an LED drive circuit (e.g., the drain-source on resistance $R_{DS-ON}$ of the FET Q262 of the LED drive circuit 260 shown in FIG. 2B). For example, the control circuit may retrieve the drain-source on resistance (e.g., a constant or fixed value) from memory. In addition, the control circuit may determine the drain-source on resistance based on a present temperature $T_{PRES}$ of the FET. For example, the control circuit may be configured to determine the present temperature $T_{PRES}$ of the FET using a temperature measuring circuit and/or a temperature sensing device, and/or may be configured to estimate the temperature of the FET Q262 based on one or more operating parameters of the electrical device.

At 528, the control circuit may be configured to calculate an operating period $T_{OP}$ (e.g., a first operating period $T_{OP1}$ as shown in FIG. 6A) for the present cycle of the drive signal $V_{DR}$. For example, the control circuit may be configured to calculate the operating period $T_{OP}$ as a function of the target current $I_{TRGT}$, the on-time $T_{ON}$ (e.g., as determined at 512), and/or the present peak magnitude $I_{PK}$ of the load current $I_{LOAD}$ (e.g., the first peak magnitude $I_{PK1}$ as determined at 526), e.g., $T_{OP}=(I_{PK}\cdot T_{ON})/I_{TRGT}$. For example, the control circuit may determine the target current $I_{TRGT}$ at 528 based on the target intensity $L_{TRGT}$ (e.g., as shown in FIG. 3). At 530, the control circuit may configure a timer with the operating period $T_{OP}$ (e.g., the first operating period $T_{OP1}$) to cause the control circuit to begin the next cycle of the LED drive circuit at the end of the operating period $T_{OP}$. For example, the timer may begin running at the beginning of the present cycle (e.g., at time $t_0$ of FIG. 6A and/or before the length of the present cycle has been determined), and the control circuit may execute the control procedure 500 again to start the next cycle when the timer indicates the end of the operating period $T_{OP}$. During a subsequent execution of the control procedure 500 (e.g., at the beginning of the next cycle), the control circuit may render the FET conductive at 514 and the load current $I_{LOAD}$ may have a second peak magnitude $I_{PK2}$ during the on-time $T_{ON}$ (e.g., as shown in FIG. 6A). In addition, the control circuit may render the first controllable switch of the current feedback circuit conductive at 516 and the magnitude of the current feedback signal $V_{FB}$ may increase to a second feedback level $V_{I-PK2}$, which may indicate the second peak magnitude $I_{PK2}$ of the load current $I_{LOAD}$. At 526, the control circuit may calculate the operating period $T_{OP}$ (e.g., a second operating period $T_{OP2}$) for the next cycle as a function of the target current $I_{TRGT}$, the on-time $T_{ON}$, and/or the present peak magnitude $I_{PK}$ of the load current $I_{LOAD}$ (e.g., a second peak magnitude $I_{PK2}$).

The control circuit may control a power converter circuit (e.g., the power converter circuit 102) to adjust the magnitude of the bus voltage to attempt to maintain the operating period $T_{OP}$ between a minimum operating period $T_{OP-MIN}$ and a maximum operating period $T_{OP-MAX}$. At 532, the control circuit may determine the minimum operating period $T_{OP-MIN}$ and the maximum operating period $T_{OP-MAX}$ based on the target intensity $L_{TRGT}$ (e.g., as shown in FIG. 3). When the operating period $T_{OP}$ (e.g., as calculated at 526) is less than the minimum operating period $T_{OP-MIN}$ at 534, the control circuit may increase the magnitude of the bus voltage $V_{BUS}$ at 536, before the control procedure 500 exits. The control circuit may increase the magnitude of the bus voltage $V_{BUS}$ by a fixed amount (e.g., a predetermined amount) and/or by a relative amount (e.g., by a percentage of the present bus voltage $V_{BUS}$). For example, after the end of the on-time $T_{ON}$ (e.g., as shown at time $t_{1a}$ of FIG. 6B), the control circuit may determine to increase the magnitude of the bus voltage $V_{BUS}$ from a first bus magnitude $V_{B1a}$ to a second bus magnitude $V_{B2a}$. For example, the second bus magnitude $V_{B2a}$ may be proportional to the first bus magnitude $V_{B1a}$, e.g., $V_{B2a}=V_{B1a}/K$, where K is a constant that is less than one. The control circuit may adjust the bus voltage control signal $V_{BUS-CTRL}$ to set the target bus voltage $V_{BUS-TRGT}$ of the power converter circuit to the second bus magnitude $V_{B2a}$ (e.g., towards the end of the operating period $T_{OP}$ as shown at time $t_{2a}$ in FIG. 6B). Since the magnitude of the bus voltage $V_{BUS}$ is equal to the second bus magnitude $V_{B2a}$ when the FET is rendered conductive at the beginning of the next cycle (e.g., at time $t_{3a}$ in FIG. 6B), the peak magnitude $I_{PK}$ of the load current $I_{LOAD}$ may increase from a first peak magnitude $I_{PK1a}$ during the previous cycle to a second peak magnitude $I_{PK2a}$ during the next cycle.

When the operating period $T_{OP}$ is not less than the minimum operating period $T_{OP-MIN}$ at 534, but is greater than the maximum operating period $T_{OP-MAX}$ at 538, the control circuit may decrease the magnitude of the bus voltage $V_{BUS}$ at 540, before the control procedure 500 exits. The control circuit may decrease the magnitude of the bus voltage $V_{BUS}$ by a fixed amount (e.g., a predetermined amount) and/or by a relative amount (e.g., by a percentage of the present bus voltage $V_{BUS}$). For example, after the end of the on-time $T_{ON}$ (e.g., as shown at time $t_{1b}$ of FIG. 6C), the control circuit may determine to decrease the magnitude of the bus voltage $V_{BUS}$ from a first bus magnitude $V_{B1b}$ to a second bus magnitude $V_{B2b}$. For example, the second bus magnitude $V_{B2b}$ may be proportional to the first bus magnitude $V_{B1b}$, e.g., $V_{B2b}=K\cdot V_{B1b}$, where K is a constant that is less than one. The control circuit may adjust the bus voltage control signal $V_{BUS-CTRL}$ to set the target bus voltage $V_{BUS-TRGT}$ of the power converter circuit to the second bus magnitude $V_{B2b}$ (e.g., towards the end of the operating period $T_{OP}$ as shown at time $t_{2b}$ in FIG. 6C). Since the magnitude of the bus voltage $V_{BUS}$ is equal to the second bus magnitude $V_{B2b}$ when the FET is rendered conductive at the beginning of the next cycle (e.g., at time $t_{3b}$ in FIG. 6C), the peak magnitude $I_{PK}$ of the load current $I_{LOAD}$ may decrease from a first peak magnitude $I_{PK1}$ during the previous cycle to a second peak magnitude $I_{PK2}$ during the next cycle.

When the operating period $T_{OP}$ is not less than the minimum operating period $T_{OP-MIN}$ at 534, and is not greater than the maximum operating period $T_{OP-MAX}$ at 538, the control procedure 500 exits without the control circuit adjusting the magnitude of the bus voltage $V_{BUS}$. After the control procedure 500 exits, the control circuit may execute the control procedure 500 again when the timer indicates the end of the operating period $T_{OP}$ (e.g., as determined at 526 of the present cycle).

Although described with reference to a controllable light source and/or an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. An electric load control device, comprising:
- electric load controller control circuitry to:
  - receive an input indicative of a target intensity value;
  - determine an ON time for an operatively coupled controllably conductive device based on the received target intensity value;
  - cause the controllably conductive device to transition to a CONDUCTIVE state to provide power to an operatively coupled electric load device for a first portion of a period;
  - receive a feedback signal indicative of a load current;
  - cause the controllably conductive device to transition to a NON-CONDUCTIVE state to interrupt power to the operatively coupled electric load device for a remaining portion of the period;
  - determine peak load current using the received feedback signal; and
  - calculate a duration of the period using the determined ON time and the determined peak current.

2. The electric load control device of claim 1 wherein to receive the feedback signal indicative of the load current, the electric load controller control circuitry to further:
- cause an operatively coupled controllable switch to transition from a NON-CONDUCTIVE state to a CONDUCTIVE state in coordination with the controllably conductive device such that the controllable switch is in the CONDUCTIVE state for at least a portion of the first portion of the period.

3. The electric load control device of claim 2 wherein to cause the operatively coupled controllable switch to transition from the NON-CONDUCTIVE state to the CONDUCTIVE state in coordination with the controllably conductive device, the electric load controller control circuitry to further:
- cause the controllable switch to transition to the CONDUCTIVE state to provide the feedback signal to the electric load controller control circuitry subsequent to the transition of the controllably conductive device to the CONDUCTIVE state; and
- cause the controllably conductive switch to transition to the NON-CONDUCTIVE state to interrupt the feedback signal to the electric load controller control circuitry subsequent to the transition of the controllably conductive device to the NON-CONDUCTIVE state.

4. The electric load control device of claim 3, the electric load controller control circuitry to further:
- determine whether calculated present operating period is less than a minimum operating period; and
- cause operatively coupled power supply circuitry to increase a bus voltage suppled to the electric load device responsive to the determination that the calculated present operating period is less than the minimum operating period.

5. The electric load control device of claim 4, the electric load controller control circuitry to further:
- determine whether calculated present operating period is greater than a maximum operating period; and
- cause the operatively coupled power supply circuitry to decrease the bus voltage suppled to the electric load device responsive to the determination that the calculated present operating period is greater than the maximum operating period.

6. The electric load control device of claim 1 wherein to determine the ON time for the operatively coupled controllably conductive device based on the received target intensity value, the electric load controller control circuitry to further:
- retrieve, from operatively coupled memory circuitry, data representative of the ON time for the operatively coupled controllably conductive device.

7. The electric load control device of claim 1 wherein to receive the feedback signal indicative of the load current, the electric load controller control circuitry to further:
- receive a voltage signal indicative of the load current.

8. The electric load control device of claim 1, the electric load controller control circuitry to further:
- maintain the controllably conductive device in the NON-CONDUCTIVE state for the calculated duration of the period.

9. A method to control an electric load device, the method comprising:
- receiving, by electric load controller control circuitry, an input indicative of a target intensity value;
- determining, by the electric load controller control circuitry, an ON time for an operatively coupled controllably conductive device based on the received target intensity value;
- causing, by the electric load controller control circuitry, the controllably conductive device to transition to a CONDUCTIVE state to provide power to an operatively coupled electric load device for a portion of a period;
- receiving, by the electric load controller control circuitry, a feedback signal indicative of a load current;
- causing, by the electric load controller control circuitry, the controllably conductive device to transition to a NON-CONDUCTIVE state to interrupt power to the operatively coupled electric load device for a remaining portion of the period;
- determining, by the electric load controller control circuitry, peak load current using the received feedback signal; and
- calculating, by the electric load controller control circuitry, a duration of the period using the determined ON time and the determined peak current.

10. The method of claim 9 wherein receiving the feedback signal indicative of the load current, further comprises:
- causing, by the electric load controller control circuitry, an operatively coupled controllable switch to transition from a NON-CONDUCTIVE state to a CONDUCTIVE state in coordination with the controllably conductive device such that the controllable switch is in the CONDUCTIVE state for at least a portion of the first portion of the period.

11. The method of claim 10 wherein causing the operatively coupled controllable switch to transition from the NON-CONDUCTIVE state to the CONDUCTIVE state in coordination with the controllably conductive device, further comprises:

causing, by the electric load controller control circuitry, the controllable switch to transition to the CONDUCTIVE state to provide the feedback signal to the electric load controller control circuitry subsequent to the transition of the controllably conductive device to the CONDUCTIVE state; and causing, by the electric load controller control circuitry, the controllably conductive switch to transition to a NON-CONDUCTIVE state to interrupt the feedback signal to the electric load controller control circuitry subsequent to the transition of the controllably conductive device to the NON-CONDUCTIVE state.

12. The method of claim 11, further comprising:

determining, by the electric load controller control circuitry, whether calculated present operating period is less than a minimum operating period; and causing, by the electric load controller control circuitry, operatively coupled power supply circuitry to increase a bus voltage suppled to the electric load device responsive to the determination that the calculated present operating period is less than the minimum operating period.

13. The method of claim 12, further comprising:

determining, by the electric load controller control circuitry, whether calculated present operating period is greater than a maximum operating period; and causing, by the electric load controller control circuitry, the operatively coupled power supply circuitry to decrease the bus voltage suppled to the electric load device responsive to the determination that the calculated present operating period is greater than the maximum operating period.

14. The method of claim 9 wherein determining the ON time for the operatively coupled controllably conductive device based on the received target intensity value, further comprises:

retrieving, by the electric load controller control circuitry from operatively coupled memory circuitry, data representative of the ON time for the operatively coupled controllably conductive device.

15. The method of claim 9 wherein receiving the feedback signal indicative of the load current, further comprises:

receiving, by the electric load controller control circuitry, a voltage signal indicative of the load current.

16. The method of claim 9, further comprising:

causing, by the electric load controller control circuitry, the controllably conductive device to remain in the NON-CONDUCTIVE state for the calculated duration of the period.

17. A non-transitory, machine-readable, storage device that includes instructions that, when executed by electric load controller control circuitry disposed in an electric load control device couplable to an electric load device, cause the electric load controller control circuitry to:

receive an input indicative of a target intensity value;

determine an ON time for an operatively coupled controllably conductive device based on the received target intensity value;

cause the controllably conductive device to transition to a CONDUCTIVE state to provide power to an operatively coupled electric load device for a portion of a period;

receive a feedback signal indicative of a load current;

cause the controllably conductive device to transition to a NON-CONDUCTIVE state to interrupt power to the operatively coupled electric load device for a remaining portion of the period;

determine a peak load current using the received feedback signal; and calculate a duration of the period using the determined ON time and the determined peak current.

18. The non-transitory, machine-readable, storage device of claim 17 wherein the instructions that cause the electric load controller control circuitry to receive the feedback signal indicative of the load current, further cause the electric load controller control circuitry to:

cause an operatively coupled controllable switch to transition from a NON-CONDUCTIVE state to a CONDUCTIVE state in coordination with the controllably conductive device such that the controllable switch is in the CONDUCTIVE state for at least a portion of the first portion of the period.

19. The non-transitory, machine-readable, storage device of claim 17 wherein the instructions that cause the electric load controller control circuitry to cause the operatively coupled controllable switch to transition from the NON-CONDUCTIVE state to the CONDUCTIVE state in coordination with the controllably conductive device, further cause the electric load controller control circuitry to:

cause the controllable switch to transition to the CONDUCTIVE state to provide the feedback signal to the electric load controller control circuitry subsequent to the transition of the controllably conductive device to the CONDUCTIVE state; and cause the controllably conductive switch to transition to a NON-CONDUCTIVE state to interrupt the feedback signal to the electric load controller control circuitry subsequent to the transition of the controllably conductive device to the NON-CONDUCTIVE state.

20. The non-transitory, machine-readable, storage device of claim 19 wherein the instructions, when executed by the electric load controller control circuitry, further cause the electric load controller control circuitry to:

determine whether calculated present operating period is less than a minimum operating period; and cause operatively coupled power supply circuitry to increase a bus voltage suppled to the electric load device responsive to the determination that the calculated present operating period is less than the minimum operating period.

21. The non-transitory, machine-readable, storage device of claim 20 wherein the instructions, when executed by the electric load controller control circuitry, further cause the electric load controller control circuitry to:

determine whether calculated present operating period is greater than a maximum operating period; and cause the operatively coupled power supply circuitry to decrease the bus voltage suppled to the electric load device responsive to the determination that the calculated present operating period is greater than the maximum operating period.

22. The non-transitory, machine-readable, storage device of claim 21 wherein the instructions that cause the electric load controller control circuitry to determine the ON time for the operatively coupled controllably conductive device based on the received target intensity value, further cause the electric load controller control circuitry to:

retrieve, from operatively coupled memory circuitry, data representative of the ON time for the operatively coupled controllably conductive device.

23. The non-transitory, machine-readable, storage device of claim 17 wherein the instructions that cause the electric load controller control circuitry to receive the feedback signal indicative of the load current, further comprises:

receive a voltage signal indicative of the load current.

24. The non-transitory, machine-readable, storage device of claim 17 wherein the instructions, when executed by the electric load controller control circuitry, further cause the electric load controller control circuitry to:

cause the controllably conductive device to remain in the NON-CONDUCTIVE state for the calculated duration of the period.

* * * * *